US006611921B2

(12) United States Patent
Casebolt et al.

(10) Patent No.: US 6,611,921 B2
(45) Date of Patent: Aug. 26, 2003

(54) INPUT DEVICE WITH TWO INPUT SIGNAL GENERATING MEANS HAVING A POWER STATE WHERE ONE INPUT MEANS IS POWERED DOWN AND THE OTHER INPUT MEANS IS CYCLED BETWEEN A POWERED UP STATE AND A POWERED DOWN STATE

(75) Inventors: Mark W. Casebolt, Seattle, WA (US); Gary Rensberger, Redmond, WA (US); Steven N. Bathiche, Redmond, WA (US); Sean Gorman, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/991,656

(22) Filed: Nov. 26, 2001

(65) Prior Publication Data

US 2003/0061524 A1 Mar. 27, 2003

Related U.S. Application Data

(62) Division of application No. 09/948,099, filed on Sep. 7, 2001.

(51) Int. Cl.⁷ ............................ G06F 1/26; G06F 1/32
(52) U.S. Cl. ................... 713/324; 713/320; 713/323; 713/330
(58) Field of Search ................... 713/300, 320, 713/323, 324, 330; 345/163, 165, 166, 156, 172

(56) References Cited

U.S. PATENT DOCUMENTS

| 3,333,160 A | 7/1967 | Gorski |
| 3,453,535 A | 7/1969 | Anglin |
| 3,551,919 A | 1/1971 | Forbes |

(List continued on next page.)

FOREIGN PATENT DOCUMENTS

| JP | 05181597 A | * | 7/1993 | ........... G06F/3/033 |
| JP | 2000066836 A | * | 3/2000 | ........... G06F/3/033 |
| WO | WO 98/05025 | | 2/1998 | |

OTHER PUBLICATIONS

Abdul Wahab, Tan Eng Chong and Low Kay Min, "Wireless Pointing Device Using Capacitive Coupling", IEEE, ISCE '97—Proceedings of 1997 IEEE International Symposium on Consumer Electronics, Dec. 2–4, 1997, 149–152.*

Hal Philipp (Quantum Research Group Ltd.), The Charge Transfer Sensor, Sensors, Nov. 1996, 4 pp., Helmers Publishing, Inc., Peterborough, NH.

IBM Corp., Personal Computer Environmental Control Via a Proximity Sensor, IBM Technical Disclosure Bulletin, Aug. 1993, vol. 36, No. 08.

(List continued on next page.)

*Primary Examiner*—Thomas Lee
*Assistant Examiner*—James K. Trujillo
(74) *Attorney, Agent, or Firm*—Banner & Witcoff, Ltd.

(57) ABSTRACT

Power management is provided in a user operated data input device utilizing proximity sensing and switching between three or more power states. Capacitive proximity sensing may be carried out by detecting a relative change in the capacitance of a "scoop" capacitor formed by a conductor and a surrounding ground plane, wherein charge is transferred between the "scoop" capacitor and a relatively large "bucket" capacitor, a voltage of the bucket capacitor is applied to an input threshold switch, and a number of cycles of charge transfer required to reach the state transition is determined. Switching between the power states occurs based upon the presence or absence of input activity, and an operation instrumentality (e.g., a hand) in close proximity to or contact with the device. In an optical surface tracking cursor control device embodiment, switching to and from a BEACON state, which provides a reduced flash rate of a surface illuminating light source, is carried out based upon a detected presence or absence of a trackable surface.

44 Claims, 11 Drawing Sheets

U.S. PATENT DOCUMENTS

| | | |
|---|---|---|
| 3,575,640 A | 4/1971 | Ishikawa |
| 3,588,038 A | 6/1971 | Tanaka |
| 3,761,805 A | 9/1973 | Domberger |
| 3,836,813 A | 9/1974 | Chambers |
| 3,922,526 A | 11/1975 | Cochran |
| 4,149,231 A | 4/1979 | Bukosky et al. |
| 4,203,153 A | 5/1980 | Boyd |
| 4,409,665 A | 10/1983 | Tubbs |
| 4,422,163 A | 12/1983 | Oldenkamp |
| 4,558,274 A | 12/1985 | Carusillo |
| 4,593,323 A | 6/1986 | Kanda et al. |
| 4,639,864 A | 1/1987 | Katzman et al. |
| 4,649,373 A | 3/1987 | Bland et al. |
| 4,698,748 A | 10/1987 | Juzswik et al. |
| 4,736,097 A | 4/1988 | Philipp |
| 4,743,837 A | 5/1988 | Herzog |
| 4,755,707 A | 7/1988 | Nakaya et al. |
| 4,766,567 A | 8/1988 | Kato |
| 4,806,846 A | 2/1989 | Kerber |
| 4,872,485 A | 10/1989 | Laverty, Jr. |
| 4,879,461 A | 11/1989 | Philipp |
| 4,907,183 A | 3/1990 | Tanaka |
| 4,922,450 A | 5/1990 | Rose et al. |
| 4,972,070 A | 11/1990 | Laverty, Jr. |
| 4,977,537 A | 12/1990 | Dias et al. |
| 5,012,406 A | 4/1991 | Martin |
| 5,025,516 A | 6/1991 | Wilson |
| 5,033,508 A | 7/1991 | Laverty, Jr. |
| 5,065,357 A | 11/1991 | Shiraishi et al. |
| 5,148,380 A | 9/1992 | Lin et al. |
| 5,159,276 A | 10/1992 | Reddy, III |
| 5,163,153 A | 11/1992 | Cole et al. |
| 5,175,845 A | 12/1992 | Little |
| 5,218,704 A | 6/1993 | Watts, Jr. et al. |
| 5,231,380 A | 7/1993 | Logan |
| 5,247,655 A | 9/1993 | Khan et al. |
| 5,249,298 A | 9/1993 | Bolan et al. |
| 5,255,341 A | 10/1993 | Nakajima |
| 5,256,913 A | 10/1993 | Sommer |
| 5,276,890 A | 1/1994 | Arai |
| 5,294,889 A | 3/1994 | Heep et al. |
| 5,329,239 A | 7/1994 | Kindermann et al. |
| 5,355,503 A | 10/1994 | Soffel et al. |
| 5,369,443 A | 11/1994 | Woodham |
| 5,369,771 A | 11/1994 | Gettel |
| 5,371,693 A | 12/1994 | Nakazoe |
| 5,384,457 A | 1/1995 | Sommer |
| 5,396,443 A | 3/1995 | Mese et al. |
| 5,404,541 A | 4/1995 | Hirosawa et al. |
| 5,408,668 A | 4/1995 | Tornai |
| 5,428,790 A | 6/1995 | Harper et al. |
| 5,461,321 A | 10/1995 | Sanders et al. |
| 5,557,440 A | 9/1996 | Hanson et al. |
| 5,570,869 A | 11/1996 | Diaz et al. |
| 5,572,205 A | 11/1996 | Caldwell et al. |
| 5,590,343 A | 12/1996 | Bolan et al. |
| 5,669,004 A | 9/1997 | Sellers |
| 5,730,165 A | 3/1998 | Philipp |
| 5,854,621 A * | 12/1998 | Junod et al. ................ 345/158 |
| 5,903,767 A | 5/1999 | Little |
| 5,925,110 A | 7/1999 | Klein |
| 5,990,868 A | 11/1999 | Frederick |
| 6,172,354 B1 | 1/2001 | Adan et al. |
| 6,269,449 B1 * | 7/2001 | Kocis ......................... 713/310 |
| 6,288,707 B1 * | 9/2001 | Philipp ....................... 345/168 |
| 6,304,249 B1 * | 10/2001 | Derocher et al. ........... 345/163 |
| 2001/0015718 A1 | 8/2001 | Hinckley et al. |
| 2002/0083357 A1 * | 6/2002 | McGowan et al. ......... 713/323 |
| 2002/0093481 A1 * | 7/2002 | Kehlstadt ................... 345/156 |

OTHER PUBLICATIONS

Brett Glass, Power Management, BYTE, Sep. 1991, pp. 329–335.

G.J. Yeh, I. Dendo, W. H. KO, Switched Capacitor Interface Circuit for Capacitive Transducers, 1985, pp. 60–63, CH2127–9/85/0000–0060, IEEE.

Jim Williams, Applications for a Switched–Capacitor Instrumentation Building Block, Jul. 1985, pp. AN3–1–AN3–16, Application Note 3, Linear Technology.

U.S. Provisional Application No. 60/261,543, filed on Jan. 12, 2001.

* cited by examiner

INPUT DEVICE WITH TWO INPUT SIGNAL GENERATING MEANS HAVING A POWER STATE WHERE ONE INPUT MEANS IS POWERED DOWN AND THE OTHER INPUT MEANS IS CYCLED BETWEEN A POWERED UP STATE AND A POWERED DOWN STATE

This application is a divisional and claims the benefit of prior U.S. application Ser. No. 09/948,099, filed Sep. 7, 2001.

FIELD OF THE INVENTION

The present invention relates to power management systems and methods that may be advantageously used in managing power consumption in electronic devices, particularly hand operated data input devices. The invention further concerns sensing systems and methods usable as part of a power management system, and for other purposes. More specifically, the invention relates to sensing and power management systems and methods that may be used to conserve battery power in wireless data input devices having components that consume power at a relatively high rate.

BACKGROUND OF THE INVENTION

Power management in electronic devices is becoming increasingly important as greater reliance is placed on battery power, e.g., for portable computers, personal data assistants (PDAs), tablet computers, cellular phones, pagers, and wireless computer peripherals. The components of such devices are becoming increasingly power hungry, and the demand for longer intervals between battery replacement or recharging has increased. Such devices are often turned on for ready usability but left idle for significant periods of time. This presents an opportunity to reduce depletion of battery power through the use of reduced power modes.

Recently, wireless peripheral devices intended for use with a host computer have been introduced. In particular, cursor control (pointing) devices such as a computer mouse and trackball device have been made wireless by inclusion of a battery power source within the device and the provision of a wireless data link, e.g., an infrared or RF transmitter/receiver pair. Without effective power management, continuous operation of such wireless peripherals will rapidly deplete the limited battery power of the device, thus requiring frequent battery replacement or recharging.

In another line of technological development, cursor control devices utilizing optical surface tracking systems have been introduced and are increasingly being used in lieu of devices relying on conventional opto-electric encoder wheel arrangements. Optical tracking can provide more reliable and accurate tracking by eliminating moving parts (e.g., a ball and associated encoder wheels), which are prone to malfunction from the pick-up of dirt, oils, etc. from the tracked support surface and/or a user's hand. On the other hand, optical tracking requires considerably more power for driving the circuitry used to illuminate a trackable surface and to receive and process light (image information) reflected from the trackable surface. Exemplary optical tracking systems, and associated signal processing techniques, are disclosed in commonly owned U.S. Pat. No. 6,172,354 (Adan et al.) and applications Ser. No. 09/692,120, filed Oct. 19, 2000, and Ser. No. 09/273,899, filed Mar. 22, 1999, each of which is hereby incorporated by reference in its entirety.

Heretofore, limited use of optical tracking systems has been made in wireless cursor control devices, due to the relatively large power requirements of both the optical tracking system and the wireless data transmitter. In one recent offering, the Logitech Cordless Mouseman® Optical, multiple sleep and awake modes are utilized to increase battery life. Switching from a full run mode through a succession of reduced power modes is carried out based upon durations of user inactivity. Whenever the user moves the mouse or clicks a mouse button, the mouse returns to the full run mode.

Various types of user proximity detectors are known, and used in power management systems and myriad other applications. For example, Tournai U.S. Pat. No. 5,408,668 discloses a processor based control system for connecting and disconnecting a computer peripheral device (e.g., a display monitor or printer) to a power source. The control is based upon input activity signals received from an input source such as a keyboard, mouse, printer or an occupancy sensor.

Mese et al. U.S. Pat. No. 5,396,443 discloses power saving control arrangements for information processing apparatus. More specifically, the Mese et al. '443 patent describes various systems for (1) detecting the approach (or contact) of a user associated medium to (or with) the apparatus; (2) placing a controlled object of the apparatus in a non-power saving state when such contact or approach is detected; and (3) placing the controlled object in a power saving state when the presence of the user associated medium (i.e., a stylus pen or part of a user's body) is not detected for a predetermined period of time.

The '443 patent describes various types of approach/contact sensors. Among these, various "tablet" type sensor systems are described, including electromagnetic, capacitance, and electrostatic coupling tablets. In one embodiment, a contact or approach detecting tablet, and a flat display panel, may be integrally formed with a housing of the information processing apparatus.

Philipp U.S. Pat. No. 5,730,165 describes a capacitive field detector used to provide on-off control of a water fountain or wash basin faucet, based upon a detected approach or presence of a user.

In one embodiment of the Philipp '165 patent, a voltage-limited current source feeds a charging current to a plate. At the end of a charging interval, a discharge switch controlled by a microprocessor closes briefly to discharge the sensing plate into a charge detector, e.g., a charge detecting capacitor. The amount of charge so transferred is representative of the capacitance of the sensing plate. The charge-discharge process can be repeated numerous times, in which case the charge measurement means aggregates the charge from the plate over several operating cycles. After a predetermined number of cycles of charge and discharge, the charge detector is examined for total final charge, by an A/D converter, and as a result the controller may generate an output control signal on an output line which may be used to cause a faucet to open. After each reading, the controller resets the charge detector to allow it to accumulate a fresh set of charges from the plate. Alternatively, the controller can take a reading after each individual cycle of the discharging switch, and then integrate (or otherwise filter) the readings over a number of cycles prior to making a logical decision resulting in a control output.

Sellers U.S. Pat. No. 5,669,004 discloses a system for reducing power usage in a personal computer. More specifically, a power control circuit is disclosed for powering down portions of a personal computer in response to user inactivity, and for delivering full power to these portions once user activity is detected via one or more sensors. The components to which power is reduced (or removed) are components which can respond almost immediately to being turned on. On the other hand, components which require a period of time to come up to full operation (e.g., disk drive motors, monitor, main processor) are driven to full power. In the primary embodiment that is disclosed, the sensor is a piezoelectric sensor fitted into a keyboard. Sellers discloses that sensors may be positioned at other locations on the computer (a monitor, mouse, trackball, touch pad or touch screen) and that various other kinds of sensors (capacity, stress, temperature, light) could be used instead of piezoelectric sensors.

SUMMARY OF THE INVENTION

The present invention has several aspects which may be advantageously (but not necessarily) utilized in combination with each other to provide effective power management in user operated data input devices. Capacitive sensing system and method aspects of the invention are not limited to power management and can be implemented in essentially any application (data input devices or otherwise) where there is a desire to reliably and efficiently sense the presence (or absence) of an object or body portion in contact with or close proximity to another object. Power management aspects of the invention are embodied in user operated data input devices, and methods of power management carried out within such devices. Particularly advantageous use may be made of the capacitive sensing and power management aspects of the invention together with each other, to substantially increase battery life in a wireless cursor control device (e.g., computer mouse or trackball device) or other user operated data input device, especially one including circuit components (e.g., an optical tracking system and RF transmitter) that draw relatively large amounts of electrical power.

In a first aspect, the invention is embodied in a capacitive sensing system for sensing the presence of an object or body portion in contact with or close proximity to another object. A first conductor is capacitively coupled to a ground to thereby form a scoop capacitor having a capacitance which varies in relation to the proximity of the object or body portion to the conductor. A pair of second and third conductors form a bucket capacitor having a capacitance which is larger than a maximum capacitance of the scoop capacitor, and an input threshold switch is provided. Switching means are provided for selectively: connecting at least one of the scoop capacitor and bucket capacitor to a voltage source to charge the at least one capacitor, varying the charge of the bucket capacitor in relation to a relative size of the scoop capacitor, and applying a voltage of the bucket capacitor to the input threshold switch. A detector means is provided for detecting an input state of the input threshold switch. Determining means determine a value (TouchVal) relating to a number of cycles of varying of the bucket capacitor charge corresponding to a detection of a transition of the input threshold switch by the detector means. Signal generating means generate, based upon TouchVal, a signal indicative of an ON state wherein the object or body portion is in contact with or close proximity to another object, and an OFF state wherein the object or body portion is not in contact with or close proximity to another object.

In a second aspect, the invention is embodied in a user operated data input device. First and second data input signal generating means are provided for generating respective first and second data input signals. A power supply is provided for selectively supplying electrical power to the first and second input signal generating means. A sensing system senses the presence of an operation instrumentality in contact with or close proximity to the input device, and generates a signal indicative of an ON state wherein the operation instrumentality is in contact with or close proximity to the input device, and an OFF state wherein the operation instrumentality is not in contact with or close proximity to the input device. A power management system controls the supply of power to the first and second input signal generating means. The power management system provides switching between at least three power states. In a first of the power states, each of the first and second input signal generating means is powered-up to a normal operation level and sampled for input activity. In a second of the power states, each of the first and second input signal generating means are cycled between a powered-up state wherein sampling for input activity is carried out, and a powered down state. In a third of the power states, the first signal generating means remains powered down while the second signal generating means is cycled between a powered-up state wherein sampling for input activity is carried out, and a powered down state. A transition from the first power state to the third power state occurs upon a transition of the sensing system from the ON state to the OFF state. A transition from the third power state to one of the first and second power states occurs upon a transition of the sensing system from the OFF state to the ON state. A transition from the second power state to the first power state occurs upon a detection of input activity during the sampling of the first and second input signal generating means.

In a third aspect, the invention is embodied in a hand-held cursor control device comprising an optical tracking engine including a light source which is flashed. A detector means detects light from the light source which has been reflected off of a surface. Determining means are provided for determining the presence or absence of a trackable surface. A control means controls the light source such that (a) when the determining means determines the presence of a trackable surface the light source is flashed at a first rate permitting tracking of the surface, and (b) when the determining means determines the absence of a trackable surface the light source is flashed at a second rate lower than the first rate.

In a fourth aspect, the invention is embodied in a method for sensing the presence of an object or body portion in contact with or close proximity to another object. The method is carried out with a first conductor capacitively coupled to a ground to thereby form a scoop capacitor having a capacitance which varies in relation to the proximity of the object or body portion to the conductor. A pair of second and third conductors are provided, which form a bucket capacitor having a capacitance which is larger than a maximum capacitance of the scoop capacitor; and an input threshold switch. Switching is performed to selectively: connect at least one of the scoop capacitor and the bucket capacitor to a voltage source to charge the at least one capacitor, varying the charge of the bucket capacitor in relation to a relative size of the scoop capacitor, and apply a voltage of the bucket capacitor to the input threshold switch. An input state of the input threshold switch is detected. A value (TouchVal) is determined, which relates to a number of cycles of varying the bucket capacitor charge corresponding to a detection of a transition of the input threshold switch. Based upon TouchVal, a signal is generated which is indicative of an ON state wherein the object or body portion is in contact with or close proximity to another object, and an OFF state wherein the object or body portion is not in contact with or close proximity to the object.

In a fifth aspect, the invention is embodied in a method of power management carried out by a user operated data input device comprising first and second data input signal generating means for generating respective first and second data input signals, and a power supply for selectively supplying electrical power to the first and second input signal generating means. The method involves sensing the presence of an operation instrumentality in contact with or close proximity to the input device and generating a signal indicative of an ON state wherein an operation instrumentality is in contact with or close proximity to the input device, and an OFF state wherein the operation instrumentality is not in contact with or close proximity to the input device. The supply of power to the first and second input signal generating means is controlled by providing switching between at least three power states. In a first of the power states, each of the first and second input signal generating means is powered-up to a normal operation level and sampled for input activity. In a second of the power states, each of the first and second input signal generating means are cycled between a powered-up state wherein sampling for input activity is carried out, and a powered down state. In a third of the power states, the first signal generating means remains powered down while the second signal generating means is cycled between a powered-up state wherein sampling for input activity is carried out, and a powered down state. A transition from the first power state to the third power state occurs upon a transition of the sensing system from the ON state to the OFF state. A transition from the third power state to one of the first and second power states occurs upon a transition of the sensing system from the OFF state to the ON state. A transition from the second power state to the first power state occurs upon a detection of input activity during the sampling of the first and second input signal generating means.

In a sixth aspect, the invention is embodied in a method carried out by a hand-held cursor control device comprising an optical tracking engine including a light source which is flashed. Light from the light source, which has been reflected off of a surface, is detected. The presence or absence of a trackable surface is determined. The light source is controlled such that (a) when the presence of a trackable surface is determined the light source is flashed at a first rate permitting tracking of the surface, and (b) when the absence of a trackable surface is determined the light source is flashed at a second rate lower than the first rate.

In a seventh aspect, the invention is embodied in an electronic device comprising a housing and a capacitive sensing system contained within the housing. The sensing system senses the presence of an operation instrumentality in contact with or close proximity to the electronic device, and generates a signal indicative of an ON state wherein an operation instrumentality is in contact with or close proximity to the electronic device, and an OFF state wherein the operation instrumentality is not in contact with or close proximity to the electronic device. The capacitive sensing system includes a conductive sensor plate in the form of a flexible label adhesively applied to the housing.

The above and other objects, features and advantages of the present invention will be readily apparent and fully understood from the following detailed description of preferred embodiments, taken in connection with the appended drawings.

DETAILED DESCRIPTION OF THE PREFERRED EMBODIMENTS

The present inventive systems and methods are described herein in terms of an exemplary application thereof within a computer input device, particularly a wireless, optically tracking computer mouse. It will be understood, however, that the inventions have much wider-ranging potential application. The capacitive sensing aspects of the present invention are not limited to power management, but rather can be implemented in virtually any device (data input device or otherwise) where it is desired to determine the presence or non-presence of an object or body portion in contact with or close proximity to another object. This includes many applications where various other types of proximity sensors have been used, e.g., water valve actuation in toilets, faucets and drinking fountains, automatic door control systems, alarm systems, security lock systems and safety interlock systems (e.g., for industrial equipment), etc.

It will be understood that the phrase "contact with or close proximity to another object" as used herein encompasses contact or close proximity with a localized object portion as well as an object in toto, and the use of multiple sensors in conjunction with each other. Thus, e.g., the inventive capacitive sensing system and method may be implemented with plural sensors for position determination purposes and/or for carrying out position dependent data input, interface or other functionalities. Such functionalities, may include, e.g., touch pad and touch strip functionalities, as well as various computer/user interface functionalities, such as are disclosed, e.g., in co-owned copending application Ser. No. 09/804,496, filed Mar. 9, 2001 (and its parent applications).

The power management aspects of the present invention may find useful application in various types of user operated data input devices—portable and non-portable, wireless and wired, self-contained and peripheral, e.g., to a host computer. The invention finds particularly useful application (but is not limited to) battery powered devices which are intermittently used and generally left on over extended periods of time so as to provide ready usability when demand so requires. Such devices include (but are not limited to) portable computers, personal data assistants (PDAs), tablet computers, cellular phones, pagers and wireless computer peripherals, e.g., mice and keyboards.

Figure 1:
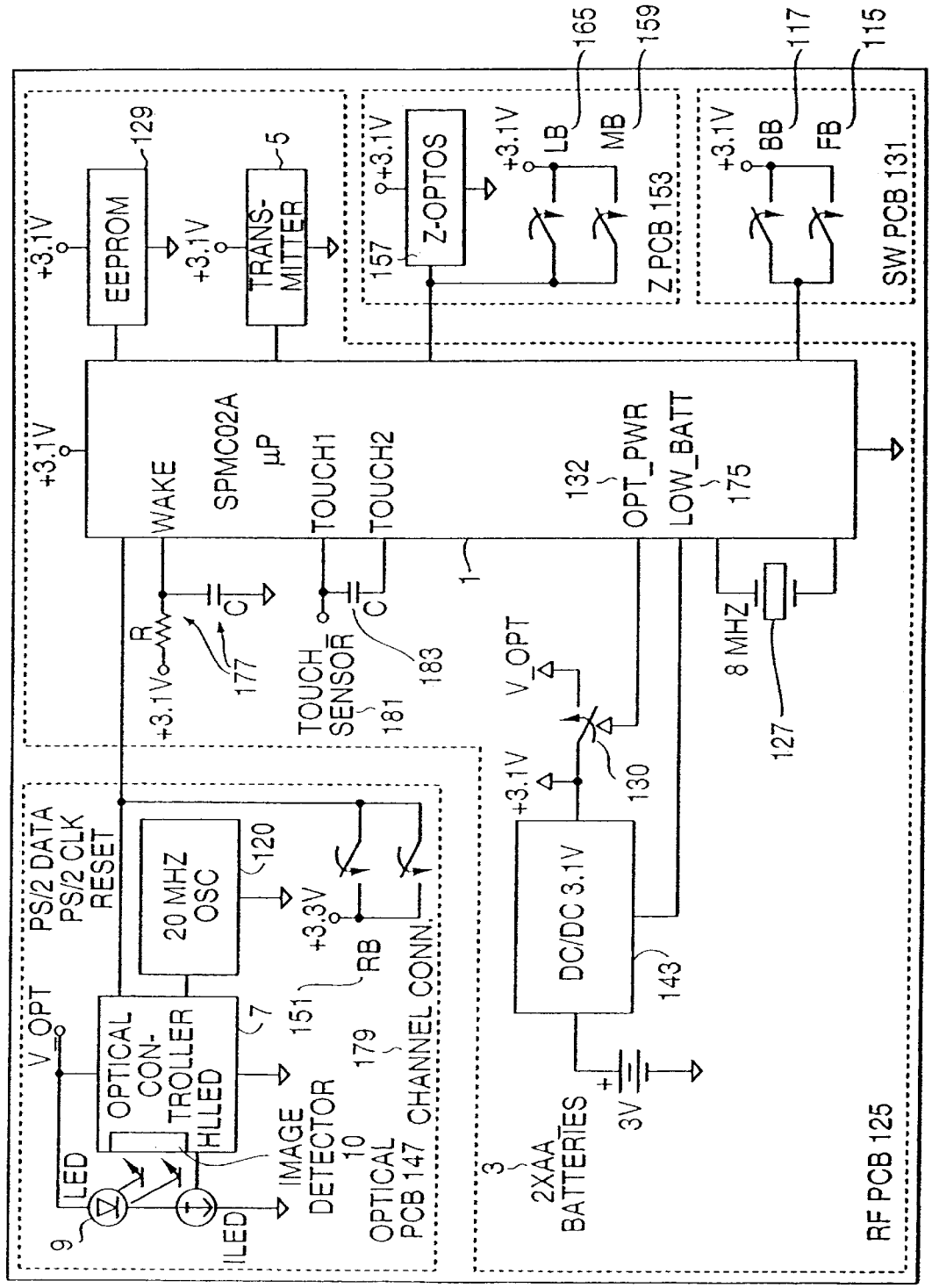
FIG. 1 is a block diagram of an electrical circuit of a wireless, optical surface tracking mouse employing capacitive sensing and power management systems in accordance with the present invention.

The block diagram of FIG. 1 shows the circuitry of an exemplary computer mouse incorporating power management and sensing systems in accordance with the present invention. The mouse is a wireless mouse employing an optical surface tracking system. Control logic may be implemented in firmware within a control integrated circuit (IC) 1, e.g., a Sunplus SPMCO2A microprocessor ($\mu$P), available from Sunplus Technology Company, Ltd. of Hsinchu, Taiwan, or an application specific integrated circuit (ASIC). In addition to managing the power supplied to the system (e.g., by 2 AA batteries 3), $\mu$P 1 performs signal processing and output functions of the mouse, and controls the wireless transmission of data packets to a host computer via an RF transmitter 5.

An optical controller IC 7 forms part of an optical tracking engine, controlling illumination of a LED light source 9 which is used to illuminate a trackable surface (e.g., a desktop). IC 7 also processes signals received from an image detector 10 (which may be included as part of IC 7) that receives light reflected from the trackable surface. The images are processed by IC 7 using spatial correlation to determine relative displacement values, in pixel or sub-pixel intervals. A stream of relative displacement values are communicated by IC 7 to $\mu$P 1 for further processing of the signals into data packets used by the host computer to control the movement of a displayed mouse cursor. $\mu$P 1 controls an RF transmission section 5 of the mouse to transmit the data packets to the host computer.

Figure 2:
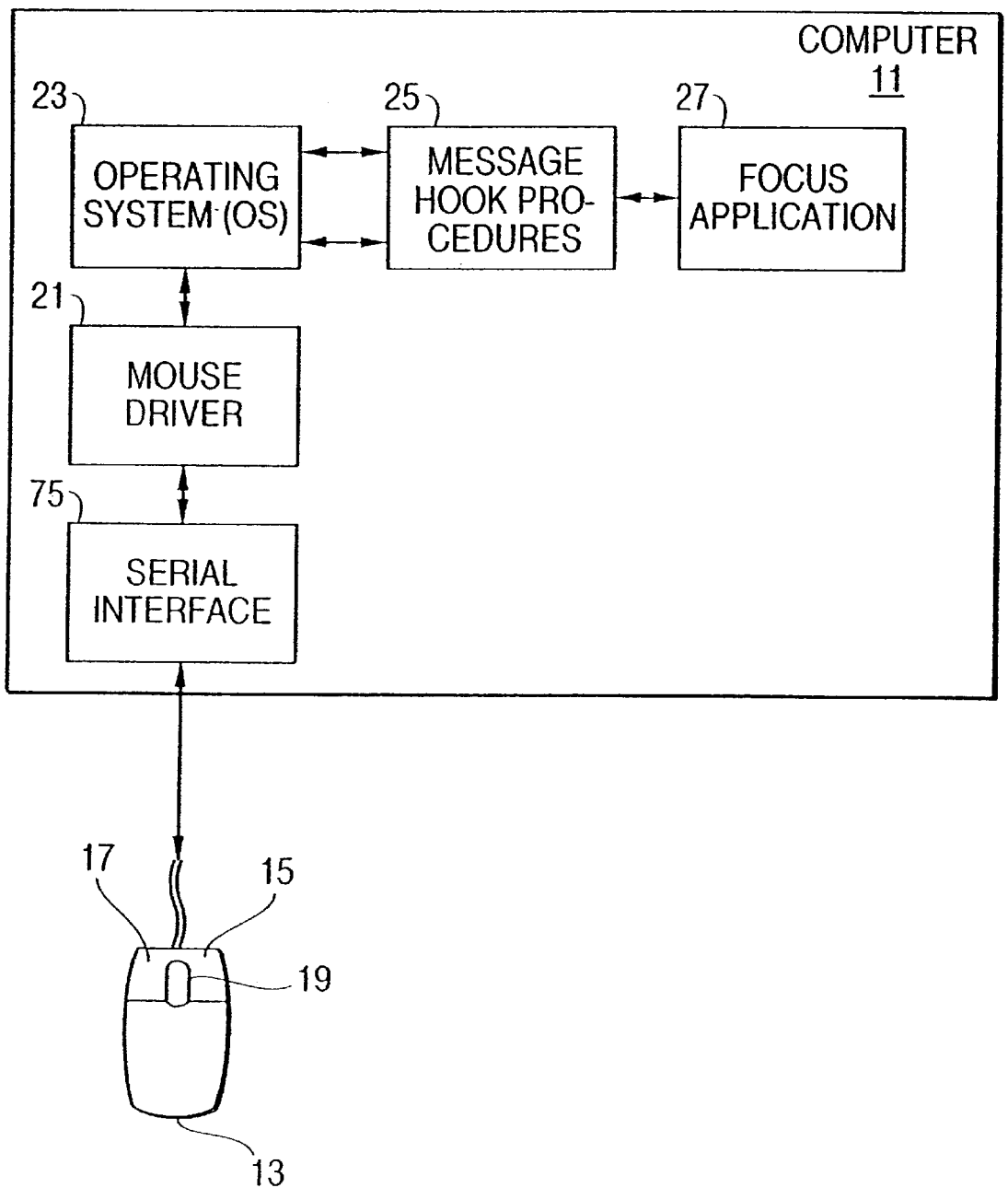
FIG. 2 is a functional block diagram of a host computer and associated cursor control device to which the present inventive systems may be applied.
Figure 3:
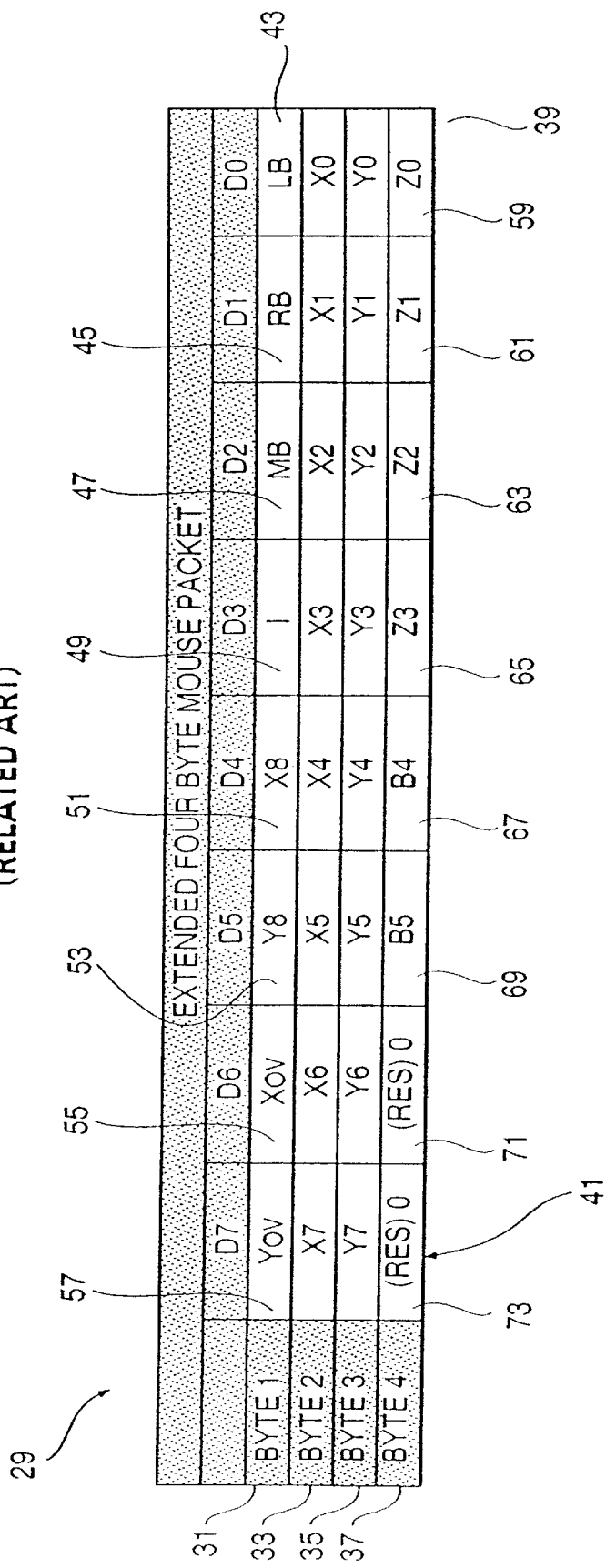
FIG. 3 is a table illustrating an exemplary packet of information that may be generated by an input pointing device, such as the mouse shown in FIG. 2, for transmission to a host computer.

FIG. 2 is a functional block diagram of a computer 11 used with an exemplary mouse 13 to which the present invention may be applied. Mouse 13 illustratively has right and left buttons 15, 17 and a depressible, rotatable scroll wheel 19 located therebetween. Obviously, mouse 13 may have more actuators (such as thumb actuation buttons or more finger actuation buttons), fewer actuators (such as only a single button or two buttons) or different types of actuators (such as triggers, rollers, etc.). Mouse 13 may instead be another type of cursor control (pointing) device, such as a trackball device. Computer 11 has firmware and/or software providing a mouse driver 21, an operating system 23, a message hook procedure 25, and a focus application 27. To better understand the operation of input device 13 in computer system 11, the components of that system are discussed in connection with a mouse packet data structure as illustrated in FIG. 3. Of course, it will be appreciated that re-arrangements of the data portions within the data structure or different data portions can be used. For example, where different actuators are used, the data structure will change accordingly.

FIG. 3 illustrates a four-byte mouse packet 29 in a row and column format with bytes 31, 33, 35, and 37 shown in rows and the individual bits of each byte shown in columns. Byte 31 is the first byte provided by input device 13, byte 33 is the second byte, byte 35 is the third byte, and byte 37 is the fourth byte. The columns of bits are organized with the least significant bits on the far right and the most significant bits on the far left. Thus, column 39 includes the least significant bits of each of the four bytes and column 41 includes the most significant bits of the four bytes.

Within mouse packet 29, first byte 31 includes left button bit 43, right button bit 45 and middle button bit 47. A one in the left button bit 43 indicates that the left button is depressed and a zero in left button bit 43 indicates the left button is not depressed. Similarly, a one in the right button bit 45 or middle button bit 47 indicates that the right button or the middle button, respectively, are depressed and a zero in either of these bits indicates that their respective button is not depressed.

Fourth bit 49 is set to a one.

Fifth bit 51 of byte 31 is the ninth bit of a 9-bit signed value that is completed by byte 33. The 9-bit value produced by the combination of bit 51 and byte 33 represents the direction and magnitude of movement of the mouse along the X-coordinate. Since the 9-bit value is in two's complement format, bit 51 indicates the direction of mouse movement such that if it has a value if zero, mouse movement is in a positive X direction and if it has a value of one, mouse movement is in the negative X direction.

Sixth bit 53 of first byte 31 is the ninth bit of a 9-bit signed value that is completed by byte 35. The combination of bit 53 and third byte 35 produces a value that indicates the magnitude and direction and movement of the mouse along the Y coordinate. Since this value is a two's complement signed value, bit 53 indicates the direction of movement along the Y coordinate such that if it has a value of one, the mouse movement is in a negative Y direction and if it has a value of zero, the mouse movement is in a positive Y direction.

Seventh bit 55 and eighth bit 57 of first byte 31 indicate whether the 9-bit values formed by bit 51 and byte 33 and by bit 53 and byte 35, respectively, have incurred an overflow condition. This occurs when more than nine bits of movement have been detected by the mouse. In this condition, the respective 9-bit value should be set to its maximum magnitude for the direction of movement.

The least significant four bits 59, 61, 63 and 65 of fourth byte 37 represent the direction and magnitude of movement of scroll wheel 19. The value represented by bits 59–65 is a signed value wherein a positive value indicates wheel motion toward the user and a negative value indicates wheel motion away from the user.

Bits 67 and 69 are the fifth and sixth bits of byte 37, respectively, and indicate closure of switches corresponding, respectively, to the left and right buttons 17, 15 of mouse 13. Thus, when bit 67 has a value of one, the switch associated with the left button is closed indicating that the corresponding mouse button has been depressed. Bit 69 reflects closure of the switch associated with right mouse button in a similar fashion.

Bits 71 and 73 of fourth byte 37 are reserved for later use and are set to zero. Those skilled in the art will recognize that mouse packet 29 illustrated in FIG. 3 and the serial interface 75 described below are used in PS/2 and serial mouse connections. For universal serial bus (USB) connections, the mouse information is sent to the mouse driver using publicly available USB protocols for mice.

In order to describe the processing of a conventional mouse message, reference is made to both FIGS. 2 and 3. To initiate a mouse message, the user first manipulates mouse 13. Based on this manipulation, mouse 13 generates a mouse packet that is passed to serial interface 75 and which is indicative of the manipulation event. When serial interface 75 receives mouse packet 29, it converts the serial information in mouse packet 29 into a set of parallel packets and provides the parallel packets to mouse driver 21. Mouse driver 21 creates a mouse message based on the manipulation event in a conventional manner.

The mouse message is then transmitted to operating system 23. Operating system 23 may be a Microsoft "WINDOWS" operating system, e.g., "WINDOWS NT®," "WINDOWS 95®," "WINDOWS 98®," or WINDOWS 2000®. Of course, other operating systems can be used as well, such as OS/2 from IBM Corporation, or UNIX, LINUX, or Apple operating systems, as well as myriad embedded application operating systems, such as are available from Wind River, Inc. Operating system 23 includes a mouse message hook list that identifies a series of mouse message hook procedures 25. When operating system 23 receives the mouse message from mouse driver 21, it examines the mouse message hook list to determine if any mouse message hook procedures have registered themselves with operating system 23. If at least one mouse message hook procedure has registered itself with operating system 23, operating system 23 passes the mouse message to the registered mouse message hook procedure 25 that appears first on the list.

The called mouse message hook executes and returns a value to operating system 23 that instructs the operating system to pass the mouse message to the next registered mouse message hook.

The mouse message may, for example, represent a command to an application which "owns" the window currently under focus in computer 11. In that instance, the message hook procedure 25 issues the command to the focus window application 27. In response, the focus window application 27 performs the desired function.

After the message hook procedure 25 issues the command to the focus application 27, the message hook procedure 25 consumes the mouse message by removing the message from the message chain. This is accomplished by returning a value to operating system 23 which indicates to the operating system that it should not pass the mouse message to any other message hook procedures.

Figure 4:
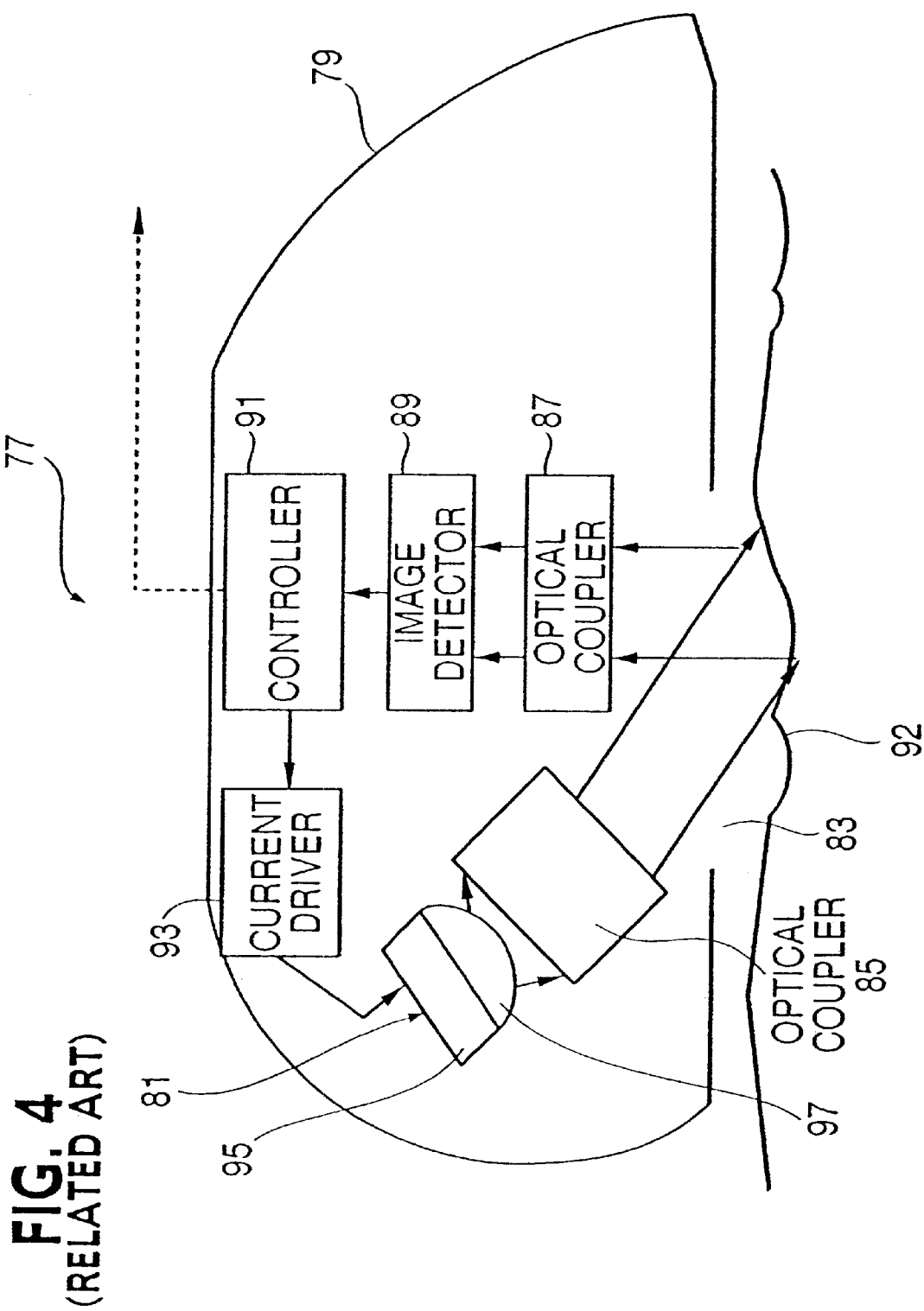
FIG. 4 is a schematic depiction of an exemplary optically tracking computer mouse, to which the present inventive capacitive sensing and power management systems may be applied.

FIG. 4 is a more detailed diagram, in partial block form and partial schematic form, illustrating an optical surface tracking mouse 77 to which the present inventive systems may be applied. Mouse 77 includes a housing 79, an electromagnetic radiation source (which may be a light source such as an LED) 81, an aperture 83 defined in the bottom of housing 79, a first optical coupler 85, a second optical coupler 87, an image or pattern detector 89, a controller 91, and a current driver 93. In FIG. 4, optical mouse 77 is shown supported relative to a work surface 92. Pattern or image detector 89 can be any suitable detector which is capable of detecting images or patterns from information carried by electromagnetic radiation impinging thereon and providing a signal indicative of such patterns or images. Pattern detector 89 may be an artificial retina pattern detector, for example, as described in greater detail below.

As mentioned, light source 81 can be any suitable source of electromagnetic radiation which can be used to provide radiation for impingement on a pattern or image and which can then be detected by pattern detector 89. In one illustrative embodiment, light source 81 includes an LED 95 and an integral lens 97. Source 81 could also be a surface mounted LED, or a low grade laser (with a wavelength in the nanometer range), for example.

Radiation emitted from LED 95 is transmitted through integral lens 97 (which is illustratively a dome shaped clear optical piece of material such as glass or plastic integral with the casing of LED 95) such that it impinges on optical coupler 85. As is described in greater detail below, optical coupler 85 collects radiation emitted by LED 95 and shapes it. The radiation exits optical coupler 85, passes through housing aperture 83 and impinges upon work surface 92. Work surface 92 may be an ordinary planar work surface, e.g., desktop, having no predetermined pattern or texture thereon, or it may be a surface provided with a predetermined pattern, texture or image. The light reflects off of work surface 92 toward optical coupler 87. Optical coupler 87 illustratively includes a lens which collects the radiation reflected from surface 92 and directs it to, and focuses it on, image detector (e.g., artificial retina) 89.

Image detector 89 generates an image signal indicative of an image or pattern on work surface 92, based on the radiation reflected from work surface 92. The image signal is provided to controller 91 which computes position information based on the image signal. The position information indicates movement of mouse 77 relative to work surface 92, e.g., in a manner such as is described in the above-identified (and incorporated by reference) patents and patent applications. Position information is provided by controller 91 in the form of an information packet, which may be transmitted to computer 11 through a cable, or through a wireless transmission link such as an infrared, ultrasonic, or radio frequency (RF) link. The position information provided by controller 91 may be provided according to a conventional serial or parallel interface format, such as universal serial bus (USB), FireWire™, I²C, PS2, ECP and EPP interface formats.

As mentioned, image detector 89 may be an artificial retina. A suitable artificial retina manufactured by Mitsubishi Electric Corporation includes a two-dimensional array of variable sensitivity photo detectors (VSPDs) and operates in a known manner. Briefly, the VSPDs are formed by a side-by-side pair of diodes integrated onto and separated by a semi-insulated GaAs layer (pn-np structure). In one embodiment, the array is a 32×32 element array, but the array could be made larger or smaller as desired. The photo detector current depends, both in sign and magnitude, on an applied voltage. Such VSPDs exhibit an analog memory effect which stores conductivity information when a voltage is applied in the presence of an optical write pulse. This information is retrieved by injecting an optical readout pulse.

As a further example, image detector 89 may be provided as part of an optical tracking IC available from Agilent Technologies Inc. of Palo Alto Calif., e.g., the ADNS 2030 and 2050 ICs. Associated imaging componentry (e.g., LED light source and optical coupling assembly) is also available from Agilent, alone or as part of a complete optical tracking engine kit intended for use in the design of an optically tracking mouse.

Image processing in such devices is based on optical matrix-vector multiplication, or approximations thereof. An input image is projected onto the device as a weight matrix. All VSPDs have one electrode connected along rows, yielding a sensitivity control vector. Thus, the VSPD sensitivity can be set to arbitrary values in each row within a certain range. In addition, the remaining VSPD electrode is connected along columns, yielding an output current vector defined by the matrix vector product of the weight matrix times the sensitivity control vector.

In an illustrative embodiment, image detector 89 is controlled, by controller 91, to perform edge extraction operations. The sensitivities of two adjacent detector rows are set to +1 and −1, respectively, whereas all other sensitivities are set at 0. In this embodiment, the output current is proportional to the difference in light intensities of the two active rows. By shifting the control voltage pattern in a cyclical manner (0, +1, −1, 0, 0, etc.), the horizontal edges of the input image are sensed. Thus, the system operates in a time sequential and semi-parallel mode.

In the illustrated embodiment, mouse 77 also includes a current driver 93 which is coupled to source 81. With this arrangement, controller 91 can be configured to intermittently sense the intensity of the radiation generated by source 81 and adjust the current provided to source 81 through current driver 93. In other words, if the sensed intensity is lower than a desired range, controller 91 may provide a feedback signal to current driver 93 to boost the current provided to source 81, in order to increase the intensity of the electromagnetic radiation emanating from source 81. If, on the other hand, the intensity of the radiation is higher than a desired range, controller 91 may provide a feedback signal to current driver 93 to reduce the current provided to source 81, to thereby reduce the intensity of the radiation emitted from source 81. This may be done to maximize the signal/noise ratio of the reflected image information. It may also serve as a means, in addition to the present inventive power management systems and methods, for reducing the overall power consumption of mouse 77.

Additional detail concerning the ways in which controller 91 may receive image signals from image detector 89 and process the image signal to generate position information are set out in the co-owned Adan et al. patent and co-pending patent applications mentioned (and incorporated by reference) above. These details are not directly relevant to (and are not necessary to an understanding of) the capacitive sensing and power management systems of the present invention. It should be noted, however, that such signal processing consumes considerably more power (typically 20–30 mA) than the signal processing associated with conventional opto-electrical encoder wheel systems (typically 1–2 mA). Additional power is also required for driving the light source of the optical tracking system.

Figure 5:
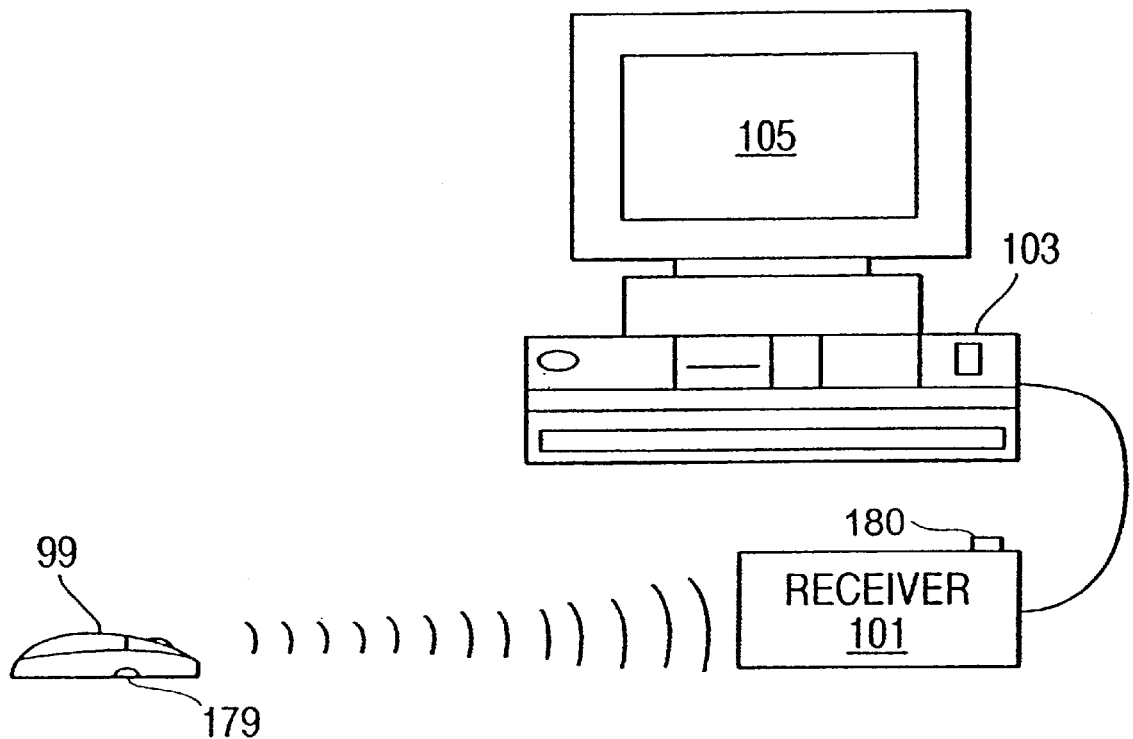
FIG. 5 is a diagrammatic illustration of a wireless mouse to which the present inventive capacitive sensing and power management systems may be applied, linked to a host computer by an RF transmitter/receiver pair.

As previously mentioned, a mouse to which the present inventive systems may be applied may have a wireless (e.g., RF or infrared) data link to a host computer. Such a system, including a mouse 99 and a receiver 101, is diagrammatically depicted in FIG. 5. Receiver 101 is an RF receiver that connects to a personal computer 103 with a uniform serial bus (USB) cable. Mouse 99 incorporates an RF transmitter and may incorporate an optical tracking system as has been described. Mouse 99 may be used in an ordinary fashion, e.g., a user can move a cursor across a computer screen by moving the mouse over a flat (planar) surface, and can control the actions of an on-screen cursor in a conventional "point and click" manner. When a user moves mouse 99 and clicks its buttons, mouse 99 generates binary data representing this activity, encapsulates the data into packets, and sends the packets to receiver 101 as radio frequency (RF) signals. The RF transmission may be carried out in a known manner, the details of which are not necessary to an understanding of the present inventive sensing and power management systems. If receiver 101 recognizes mouse 99, it sends the binary data to computer 103. The computer then reacts to the data to cause, for example, the cursor to move across the screen (monitor) 105.

Figure 6:
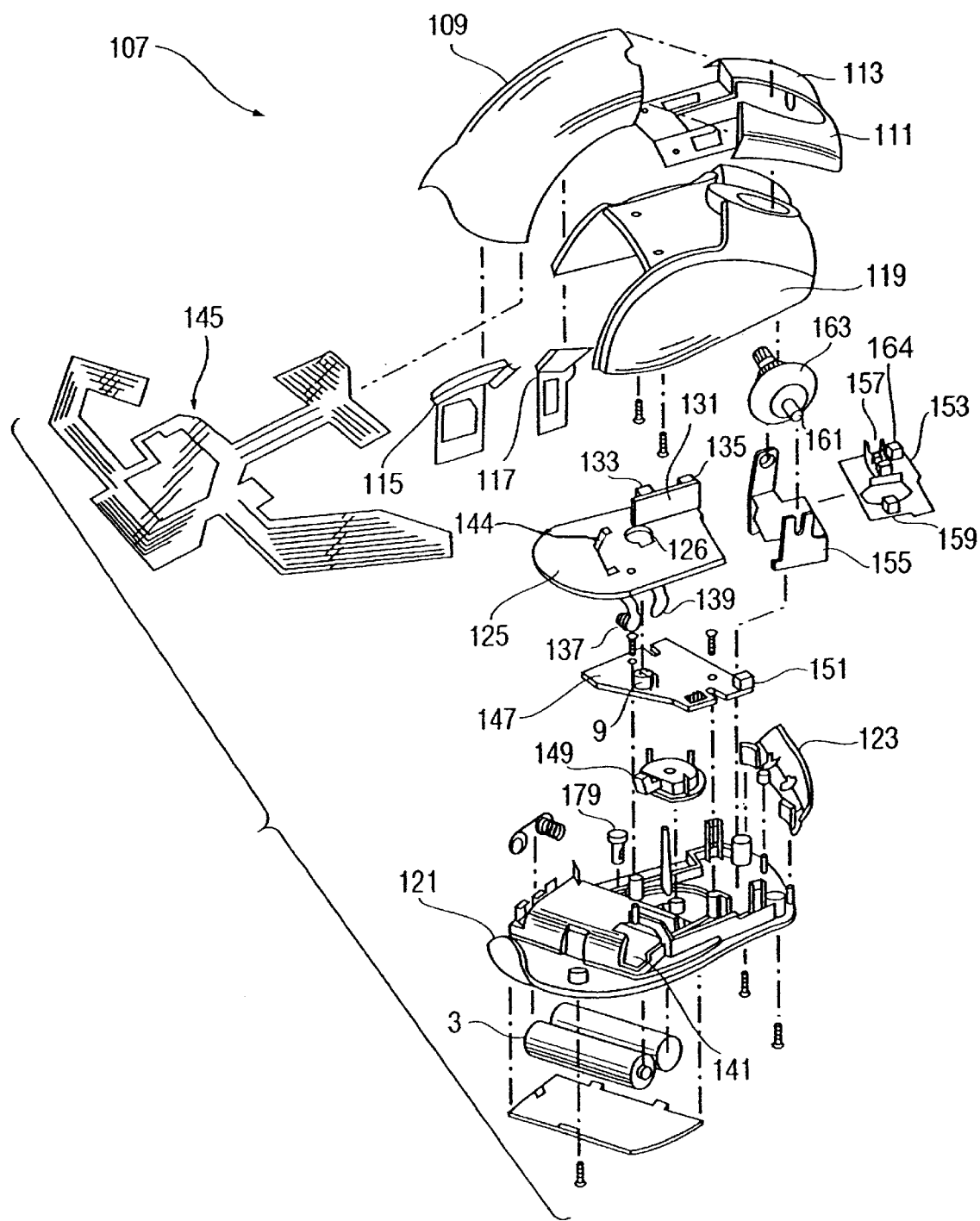
FIG. 6 is a perspective assembly drawing of a wireless optically tracking mouse, into which the sensing and power management systems illustrated in FIG. 1 are incorporated.

Referring now to the assembly drawing of FIG. 6, an exemplary optically tracking wireless mouse 107 in accordance with the present invention comprises an ergonomically shaped top case 109 and a pair of top keys or mouse buttons 111, 113. A pair of large and small side mouse keys 115, 117 are cantilever mounted upon and within an ergonomically shaped skirt 119. This sub-assembly is mounted upon a bottom case 121 to form, together with front panel 123, an insulative housing for a number of internal components of mouse 107, which are described below. The housing's component parts can be manufactured in a known manner, such as by injection molding. In one embodiment, bottom case 121 is formed of injection molded polycarbonate and the remaining housing parts are formed of injection molded ABS copolymer.

A primary printed circuit board (PCB) 125 holds, on its underside, control μP 1, RF transmitter 5, an 8 MHz oscillator 127, and an EEPROM 129, as depicted in FIG. 1. A daughter board 131 attached to PCB 125 holds a pair of switch contacts 133, 135 for front and back side keys or buttons 115, 117. Depending from an underside of PCB 125 are a pair of battery contacts 137, 139 which extend down into a battery compartment 141 formed in bottom case 121 to hold the pair of 2 AA batteries 3 arranged in series. Batteries 3 power the electrical systems of the mouse through a regulated DC/DC power supply 143 (see FIG. 1), e.g., providing a Vcc output of 3.1V DC. Extending from a top side of PCB 125 is a metal (e.g., nickel plated steel) spring contact arm 144 for contacting a conductive pad of a capacitive sensing plate 145 which is attached to the underside of the upper housing formed by top case 109 and skirt 119.

PCB 125 physically overlies a second (smaller) PCB 147 upon which is mounted, on an underside, optical controller IC 7, including integral image detector 10 and a 20 MHz oscillator 120 for providing an operation clock pulse to IC 7 (see FIG. 1). PCB 147 also holds LED 9 within an aperture thereof. LED 9 protrudes from a top surface of PCB 147 and is accommodated within an aligned aperture 126 formed in overlying PCB 125. A lens assembly 149 is provided directly below LED 9 and image detector 10 and provides optical couplers 85, 87 as diagrammatically illustrated in FIG. 4. Optical couplers 85, 87 serve, respectively, to focus light of LED 9 through an aperture provided in bottom case 121 to illuminate a supporting trackable surface, and to direct and focus onto image detector 89 light reflected off of the trackable surface. The lens assembly may have, e.g., a construction as disclosed in previously identified (and incorporated by reference) copending application Ser. No. 09/273,899. Second PCB 147 further holds a switch 151 for top right mouse button 111.

A third PCB 153 is held within a scroll wheel assembly carrier 155. Mounted thereon is an opto-electric emitter/receiver pair 157 of the scroll wheel system, and a middle mouse button switch 159 which is depressed by movably mounted scroll wheel axle 161 when scroll wheel 163 is depressed by a user. The scroll wheel system may have a construction as disclosed in copending commonly owned U.S. application Ser. No. 09/212,898, filed Dec. 16, 1998, which is hereby incorporated by reference in its entirety. Third PCB 153 also holds a switch 164 for top left mouse button 113.

Two AA alkaline batteries 3 will power mouse 107 with a capacity of about 2500 mAh. In order to conserve the limited battery power, a power management system in accordance with the invention will power down the mouse when it is not in use. The power management system is preferably implemented as firmware in $\mu P$ 1, or optionally as a separate application specific integrated circuit (ASIC). As part of the system, a touch/proximity sensor provides one of several indications of usage. There are preferably (but not necessarily) five states the mouse can be in at any given time: ACTIVE, IDLE, EXTENDED IDLE, BEACON and SHUTDOWN. The state diagram of FIG. 8 illustrates these states, and how the system transitions between the states.

Figure 8:
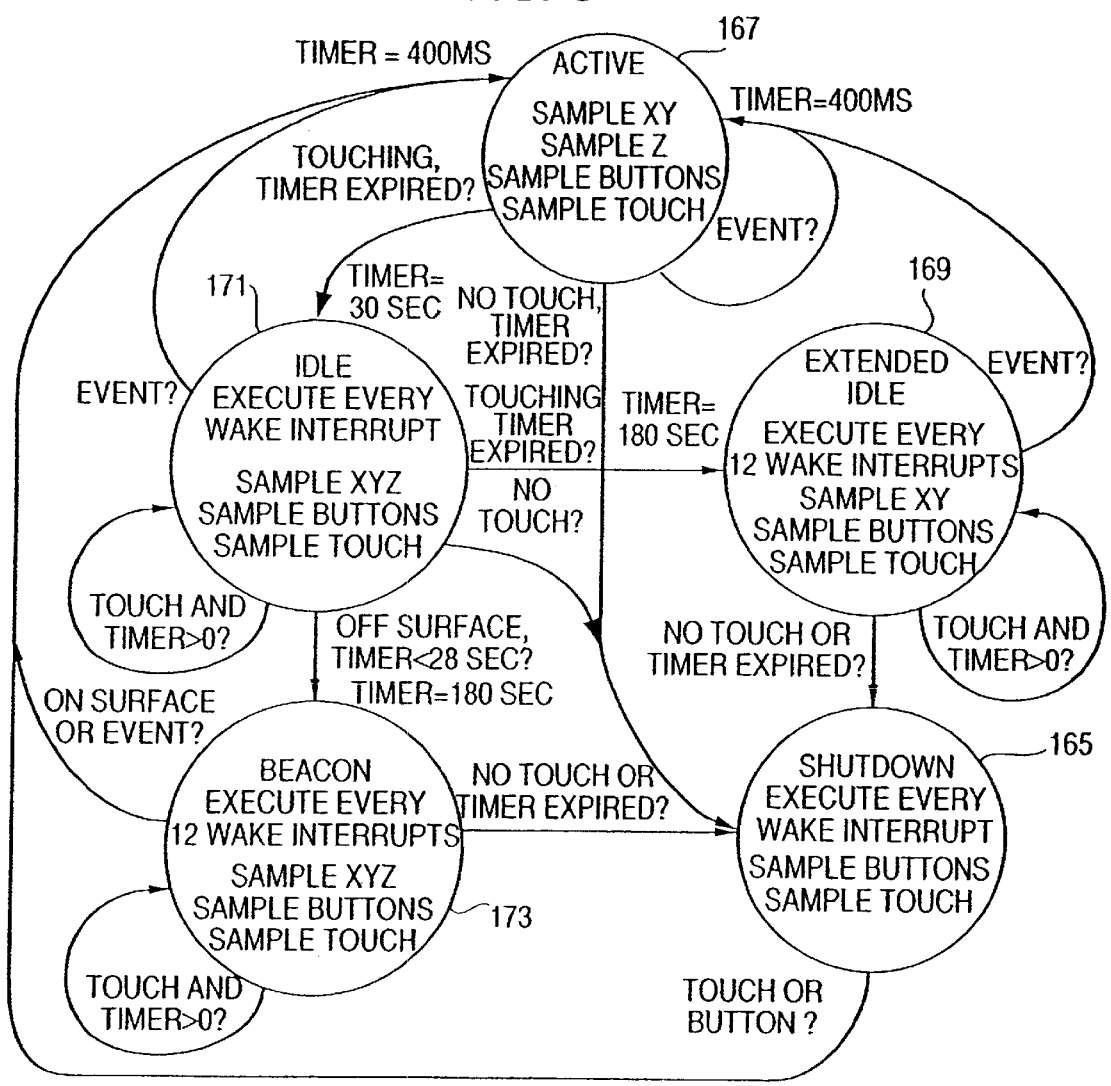
FIG. 8 is a state machine diagram illustrating exemplary logic flow and control of a power management system according to the invention, for management of power consumption in a wireless, optically tracking mouse of the type illustrated in FIG. 6.

Referring to FIG. 8, the two primary states are SHUTDOWN 165 and ACTIVE 167. In SHUTDOWN state 165, $\mu P$ 1 is placed in a reduced power mode wherein the only functions carried out are periodic monitoring for touch/proximity and mouse button and scroll wheel usage activity. Sampling for touch/proximity and button/scroll wheel activity is carried out at set "wake interrupt" intervals. EEPROM 129 (see FIG. 1) is also powered to maintain, in non-volatile memory, a security code associated with RF data transmissions to the host computer. All power to optical controller IC 7 and the associated LED light source 9 and image detector 10 (collectively the optical tracking engine), as well as RF transmitter 5, is turned off. Selective application of power from power supply 143 to the optical tracking engine is provided by switch 130, which is controlled by the logical output on pin OPT_PWR 132 of $\mu P$ 1 (see FIG. 1). SHUTDOWN state 165 preferably only occurs at times that an associated sensing algorithm is in a touch-off (OFF) state, indicating the absence of a user's hand on (or in close proximity to) a mouse mounted touch/proximity sensor. The state machine will preferably transition to SHUTDOWN state 165 upon occurrence of an OFF signal (flag) during any other state, or via a timeout from an EXTENDED IDLE state 169 (described below).

In the preferred ACTIVE state 167, each of the aforementioned mouse sub-systems is powered-up and fully operational. ACTIVE state 167 occurs only at times that the sensing algorithm is in an ON state, indicating the presence of a user's hand on (or in close proximity to) the mouse. As mentioned, the absence of a user's hand results in generation of an OFF flag. Upon a predetermined duration of mouse inactivity in ACTIVE state 167 (e.g., 400 ms), coupled with an ON state of the sensing algorithm, the state machine transitions to an IDLE state 171. In IDLE state 171, the system preferably effectively cycles between the SHUTDOWN and ACTIVE state conditions, e.g., SHUTDOWN for 80 ms, ACTIVE for 50 ms. Upon occurrence of an OFF signal, the state machine preferably immediately transitions from IDLE state 171 to SHUTDOWN state 165. If the sensing algorithm remains in the ON state, but no mouse activity, such as mouse movement, scrolling or button press activity, occurs within 30 seconds (or another preset time period), the state machine transitions to EXTENDED IDLE state 169. EXTENDED IDLE state 169 is similar to IDLE state 171 in that the system effectively cycles between the SHUTDOWN and ACTIVE state conditions 167, 165, but with a longer period of shutdown per cycle, e.g., activation approximately once every second (every 12 wake interrupts) instead of once every 80 ms (every wake interrupt).

If the touch algorithm flag remains ON, but the optical tracking system fails to detect a tracking surface for a predetermined amount of time, e.g., two or more seconds (indicating that the mouse has been picked up off its supporting surface by the user), the state machine preferably transitions to a BEACON state 173. In BEACON state 173, the power cycling of the EXTENDED IDLE state is preferably initiated (activation once every 12 wake interrupts) and the tracking light source (LED) 9 is flashed at a reduced rate, e.g., only once per second (1 Hz) instead of the nominal 8 Hz flash rate used for tracking. This substantially reduced pulse rate of the light source conserves energy, and provides positive feedback to the user, e.g., serving to avoid concern on the part of the user regarding eye exposure to the normal tracking illumination of LED 9.

Upon the occurrence of any mouse activity during IDLE state 171, EXTENDED IDLE state 169 or BEACON state 113, the state machine preferably immediately transitions back to ACTIVE state 167. In addition, the state machine will transition from BEACON state 173 back to ACTIVE state 167 once a tracking surface is again sensed by the optical tracking system. Should an OFF flag be generated during any one of IDLE state 171, EXTENDED IDLE state 161 or BEACON state 173, the state machine will immediately transition to SHUTDOWN state 165. Also, a transition to SHUTDOWN state 165 will preferably occur upon the expiration of a predetermined amount of time, e.g., 180 seconds, in either BEACON state 173 or EXTENDED IDLE state 169.

In the described exemplary (mouse) embodiment of the invention, input signal generating means are provided in the form of an optical tracking engine, mouse buttons and a scroll wheel. In the reduced power states of the invention, these means are powered down to different extents based, in part, upon the amount of power consumed by the means. It will be understood that the invention is generally applicable to virtually any type of user operated data input device having plural types of input signal generating means, to differentially control the supply of power to those means taking into account the relative power consumption rates.

The five preferred power states of the exemplary mouse embodiment are now described in further detail.

ACTIVE State 167

This is the normal operating state when the user is moving mouse 107, moving scroll wheel 163 or activating one or more of mouse buttons 111, 113, 115, 117. In ACTIVE state 167, the firmware of $\mu P$ 1 is receiving XY packets from optical controller IC 7, and sampling the mouse buttons, the scroll wheel, and the state of the sensing algorithm. $\mu P$ 1 may also be checking a level of batteries 3 via a Low-batt pin 175 (see FIG. 1). ACTIVE state 167 consumes the most power, mainly due to operation of the optical (XY) tracking engine and the RF transmitter 5. In order to conserve power, the state machine preferably maintains a timer which will expire after a predetermined period of no activity (e.g., 400 ms). If the timer expires and the user's hand is still touching (or in close proximity to) the mouse, the state machine will enter IDLE state 171. If the timer elapses, and the user is not touching (or in close proximity to) the mouse, then the state machine will enter SHUTDOWN state 165.

IDLE State 171

As mentioned above, IDLE state 171 is entered when there has been no activity for 400 ms, and the user is touching (or in close proximity to) the mouse. In this state, the mouse is essentially powered off, and µP 1 is put in a STOP mode. An external RC network 177 (see FIG. 1) is preferably used to wake µP 1 after a predetermined delay, e.g., 80 ms. Once awake, the processor will power-up and initialize IC 7, and look for XY motion. The firmware will also check for a state change of scroll wheel 163, sample the mouse buttons and sample the state (ON or OFF) of the sensing algorithm. The "on" time during IDLE state 171 is preferably about 50 ms. In addition, a 30-second timer may be set. If this timer expires before an event is detected, then the state machine will preferably enter EXTENDED IDLE state 169. If touch is released (sensing algorithm enters OFF state), then SHUTDOWN state 165 is entered. Any event will cause ACTIVE state 167 to be entered. Any of the primary mouse buttons will preferably wake the µP 1 immediately, as will actuation of a "Channel Connect" button 179 (see FIGS. 1, 5 and 6) which may be provided as part of the RF transmission system, for establishing a unique identification code of the mouse that will be recognized by the associated receiver having a corresponding "Channel Connect" button 180 (see FIG. 5).

EXTENDED IDLE State 169

This state is intended to conserve additional power, if the user has rested his hand on the mouse for a relatively long period, e.g., 30 seconds, without moving the mouse (XY motion) or the scroll wheel (Z motion), or actuating any of the mouse buttons. In this state, IC 7 is powered at a reduced rate, e.g., once a second instead of once every 130 ms. After a predetermined time in this state, e.g., 180 seconds, the mouse will enter SHUTDOWN state 165. Otherwise, EXTENDED IDLE state 169 is the same as IDLE state 171.

BEACON State 173

BEACON state 173 is intended to reduce the LED flash rate (e.g., from 8 Hz to 1 Hz) if the mouse is in IDLE state 171 and the user picks up the mouse and holds it. When the mouse is removed from a trackable surface, the surface moves out of focus and the blur becomes indistinguishable. A similar condition arises if the supporting surface is optically vague, such as a mirror or perfectly smooth or glossy surface such as a Lambertian re-radiator, i.e., a surface that the mouse cannot properly track. To recognize such a condition, IC 7 may send a status bit in every PS/2 packet that will indicate whether or not it is on a good surface. The firmware of µP 1 may check this after being in IDLE state 171, e.g., for more the 2 seconds. After entering BEACON state 173, the trackable surface bit may be checked once every second. If "on surface" is indicated, then ACTIVE state 167 is preferably reentered.

In a preferred implementation of BEACON state 173, power is repeatedly removed from IC 7 for an interval of approximately one second. Once each one second interval has expired, IC 7 is powered back-up and retests the surface. While not present on a trackable surface, LED 9 appears to "pulse" like a beacon, once a second, while retesting of the surface is carried out. In addition to conserving battery power, BEACON state 173 reduces potential annoyance by, and concern about, the normal high frequency flicker of the LED in the regular tracking mode.

Known and available optical tracking engines provide several metrics that may be used to assess the presence or absence of a trackable surface. In accordance with the invention, these metrics can be brought out on separate status bit lines of IC 7. One bit line can, e.g., indicate the status FOUND or LOST, indicating whether or not the image values (e.g., pixel intensity measures Maxpix, Minpix and Avgpix) obtained from the auto-correlation functions carried out by IC 7 are within the workable range of the optical tracking engine's A/D converter. If they are, a FOUND bit is output. If not, the auto-correlation function has failed and a LOST bit is output.

A second bit line can, e.g., provide a status of either "Velocity-Valid" or "Velocity-Invalid." Even in the case that auto-correlation is successfully carried out (thus resulting in a FOUND bit on the first bit line) the nature of the detected surface may render it untrackable, e.g., due to aliasing. Thresholds can be set to indicate when the mouse movement signals (e.g., velocity) obtained from the cross-correlation processing are outside of a range of physical possibility. For example, if the result of cross-correlation processing of IC 7 indicates that the mouse has undergone an instantaneous change of direction (a physically impossible occurrence), then a "Velocity-Invalid" or like status bit can be output. On the other hand, so long as the movement indicated by the cross-correlation processing is within a range of possible mouse movements, a "Velocity-Valid" status bit may be output.

IC 7 may employ a logical expression such as Good_Surface=FOUND && Velocity_Valid. In summary, 'FOUND' is a status bit indicating that parameters of the tracking engine are stabilized and that they are within a normal operation range for a surface that is trackable. Velocity_Valid status indicates that the outputs of the tracking engine are valid and apparently correct. The combination of these two signals may be used to provide a high degree of assurance that BEACON state 173 is entered only when the mouse has been removed from a trackable surface. When it has been detected that the mouse has been removed from a trackable surface, the state machine will transition to BEACON state 173. Upon detection of a Good_Surface, the device logic may transition to ACTIVE state 167, to present useful motion information for transmission to the host computer.

SHUTDOWN State 165

This is the lowest Power State of the mouse, wherein the mouse may draw only ~100µ amps of current. Actuation of any of the three primary (right, left and middle) mouse button switches 151, 165 and 159, or of Channel Connect button 179, will generate an interrupt causing the processor to wake immediately, and cause the state machine to enter ACTIVE state 167. Otherwise, processor 1 will enter a STOP mode, then wake after a predetermined delay (e.g., 80–85 ms). The "wake" time for µP 1 is preferably about 3 ms. In the waked state, µP 1 will poll for touch (an ON state of the sensing algorithm) and actuation of the secondary (side) buttons 115, 117. (In an exemplary embodiment, the limited number of interrupt pins on µP 1 are used for the primary mouse buttons and Channel Connect button 179. Of course, with a greater number of available interrupt pins, all of the mouse buttons could be connected to be sensed by interrupt rather than polling.) Preferably, to conserve power, no checking for XY motion (operation of the optical tracking engine) or scroll wheel rotation is carried out in the SHUTDOWN state.

Various types of operator engagement/proximity sensors may be used to provide the control input flags ON/OFF to the power management system of the invention, e.g., infrared (IR) and other light-based detectors, electrostatic, electromagnetic and mechanical switches, piezoelectric and other types of accelerometers or acoustic detectors, and thermal or temperature based switches. In a preferred embodiment, capacitive sensing is employed, preferably a novel system and method of capacitive sensing as will now be described.

In accordance with the capacitive sensing aspects of the present invention, a relative increase in a capacitance between a conductor and a device ground signals the presence of an object or body portion in contact with or close proximity to another object. As applied to a user operated data input device, the system signals the presence or absence of a user's hand or other operation instrumentality (e.g., a pen of pen based data input device) in contact with or close proximity to the device. As applied to mouse 107, the capacitive sensing system senses the presence of a user's hand on or in close proximity to mouse 107.

In accordance with the invention, a change in the size of a relatively small capacitor formed between sensor plate 145 (see FIG. 6) and its surroundings (a relative device ground) is detected by way of a charge transfer technique, in a manner which avoids processing intensive (and relatively slow) capacitance measurements by an A/D converter or the like. By way of analogy, a change in the relative size of the small ("scoop") capacitor 181 may be determined by repeatedly dumping the charge of scoop capacitor 181 into a larger ("bucket") capacitor 183 (see FIGS. 1 and 7), and counting the number of "scoops" required to "fill" the bucket capacitor. The "scoop" capacitor is modulated by the touch or close proximity of a user's hand, for example. The closer the user's hand is to the mouse, the larger the apparent size of the scoop capacitor. By counting the number of "scoops" it takes to fill the "bucket," a capacitance change initiated by a change in the user's hand proximity, as the user touches/removes his hand from the mouse, can be detected.

In a first embodiment, the inventive sensing system works by sequentially charging "scoop" capacitor 181, and dumping it into relatively large, preferably fixed size bucket capacitor 183. Bucket capacitor 183 may, e.g., have a capacitance C of 4.7 nF, whereas the capacitance of the scoop capacitor may vary within the range of 15–45 pF. The filling/dumping process is continued until bucket capacitor 183 is "full." An increase in the size of scoop capacitor 181, indicative of the presence or absence of a user's hand in contact with or close proximity to the mouse, can then be determined by how many "scoops" it took to fill the bucket.

Figure 7:
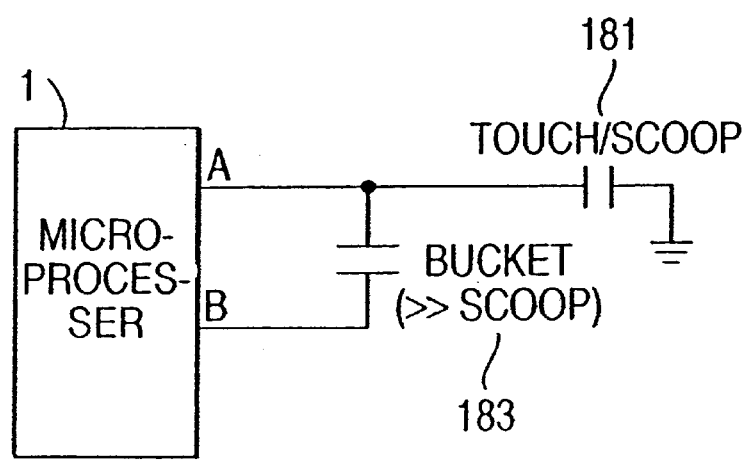
FIG. 7 is a circuit schematic of a capacitive proximity sensing system in accordance with the present invention.

As seen in FIGS. 1 and 7, a preferred implementation uses two I/O pins A, B of $\mu P$ 1 to control the filling, dumping (charge transferring) and input threshold switch sampling actions. Obviously, other hardware/software/firmware arrangements may be utilized in order to achieve the same or similar result, including arrangements of discrete circuit elements, or an ASIC, in lieu of firmware programmed $\mu P$ 1. The following steps may be executed by $\mu P$ 1 under firmware control:

1) $\mu P$ 1 clamps both pins A and B to ground, to discharge the bucket capacitor 183. Counter=0.
2) Pin B is set to be a high impedance input (floating), and Pin A is set high, to charge the scoop capacitor (without charging bucket capacitor 183).
3) Pin A is set to be a high impedance input (floating), and Pin B is driven low, to dump the charge from scoop capacitor 181 into bucket capacitor 183.
4) Counter=counter+1 (count one scoop).
5) Pin A (still a high impedance input) is sampled to see if it has crossed an input high threshold (indicates a bucket "full" condition). If not, steps 2–5 are repeated.
6) Algorithm is complete; Counter value is inversely proportional to a relative size of the scoop capacitor. The lower the Counter value, the greater the capacitance of the scoop capacitor. The Counter value may be used directly as a current touch value (TouchVal), or may be averaged into a new touch reading, e.g., TouchVal=(TouchVal+Counter)/2, in which case TouchVal is a moving average value.

Thus, following each cycle of charge transfer, an input threshold switch of $\mu P$ 1, e.g., a CMOS transistor connected to pin A, is checked to determine whether its threshold (e.g., ½ Vcc=1.55V±20%) has been reached. When it has, this indicates that the bucket capacitor is "full." A counter is incremented for each check, up to the point that the threshold voltage is exceeded. The presence of a hand on (or in close proximity to) the mouse is determined when the count related value (TouchVal) falls below a predetermined threshold count value (which is preferably dynamically adjusted in a manner to be described). The aforementioned touch-on (ON) or touch-off (OFF) signals are generated based upon this determination.

As described so far, TouchVal is a count value or moving average count value. It will be understood, however, that TouchVal could instead be another variable related to the count, e.g., a time value providing a proxy indication of the number of cycles of charge transfer required to reach the input high threshold.

In a "low-side" variation of the above technique, sampling is carried out at Pin B (instead of Pin A) at the time that Pin B is set to be a high impedance input. A CMOS transistor threshold switch of a typical controller will transition from low-to-high at a voltage that is somewhat different than the high-to-low transition point. This difference can be utilized to provide different resolutions of the count value. In carrying out the "low-side" variation, $\mu P$ 1 may execute the following steps:

1) $\mu P$ 1 clamps both pins A and B to ground, to discharge bucket capacitor 183 and scoop capacitor 181. Counter=0.
2) Pin B is set to be a high impedance input (floating), and Pin A is set high, to charge the scoop capacitor (without charging bucket capacitor 183).
3) Pin B (still a high impedance input) is sampled to see if it has crossed an input low threshold (indicates a bucket "full" condition). If crossed, proceed to step (7). If not crossed, continue to step (4).
4) Pin A is set to be a high impedance input (floating), and Pin B is driven low, to dump the charge from scoop capacitor 181 into bucket capacitor 183.
5) Counter=counter+1 (count one scoop).
6) Repeat steps 2–5.
7) Algorithm is complete; Counter value is inversely proportional to a relative size of the scoop capacitor. The lower the Counter value, the greater the capacitance of the scoop capacitor. The Counter value may be used directly as a current touch value (TouchVal), or may be averaged into a new touch reading, e.g., TouchVal=(TouchVal+Counter)/2, in which case TouchVal is a moving average value.

In an alternative embodiment that may be carried out with the circuit arrangement of FIG. 7, TouchVal may be representative of a number of cycles required to dump (rather than charge) bucket capacitor 183 through the scoop capacitor 181. Again, by way of analogy, the bucket is initially "filled," and then it is emptied, scoop by scoop, until a threshold low (or high) voltage is detected indicating that the charge of the bucket capacitor has been "emptied," i.e., reduced below a threshold level. In carrying out this alternative embodiment, µP 1 may execute the following steps:

1) µP 1 drives Pin A high and Pin B low, to charge ("fill") bucket capacitor 183.
2) Pin A is driven low and Pin B is set to be a high impedance input (floating), to dump the charge of scoop capacitor 181 to ground (without dumping the charge of bucket capacitor 183).
3) Pin A is set to be a high impedance input (floating) and Pin B is driven low, resulting in a transfer of charge from bucket capacitor 183 to scoop capacitor 181.
4) Counter=counter+1 (count one scoop).
5) Pin A (still a high impedance input) is sampled to see if it has crossed an input low threshold (indicates bucket is "empty"). If not, steps 2–5 are repeated.
6) Algorithm is complete; As in the first embodiment, the Counter value is inversely proportional to a relative size of the scoop. The lower the Counter value, the greater the capacitance of the scoop capacitor. TouchVal may be set as the Counter value itself, a moving average of the Counter value, or a value otherwise related to the Counter value, e.g., a corresponding time value.

The polarity of the charge in step (1) may be reversed such that Pin B is driven high and Pin A is driven low to charge the bucket capacitor. In this case, Pin A is sampled in step (5) to see if it crossed an input high threshold.

Similar to the first "bucket filling" embodiment, sampling may be carried out in the above "bucket emptying" embodiments at Pin B (instead of Pin A), at the time that Pin B is set as a high impedance input. In carrying out this variation, µP 1 may execute the following steps:

1) µP 1 drives Pin A high and Pin B low, to charge ("fill") bucket capacitor 183.
2) Pin A is driven low and Pin B is set to be a high impedance input (floating), to dump the charge of scoop capacitor 181 to ground (without dumping the charge of bucket capacitor 183).
3) Pin B (still a high impedance input) is sampled to see if it has crossed an input high threshold (indicates bucket is "empty"). If crossed, proceed to step (7). If not crossed, then continue to step (4).
4) Pin A is set to a high impedance input (floating) and Pin B is driven low, resulting in a transfer of charge from bucket capacitor 183 to scoop capacitor 181.
5) Counter=counter+1 (count one scoop).
6) Repeat steps 2–5.
7) Algorithm is complete; as in the first embodiment, the Counter value is inversely proportional to a relative size of the scoop. The lower the Counter value, the greater the capacitance of the scoop capacitor. TouchVal may be set as the Counter value itself, a moving average of the Counter value, or a value otherwise related to the Counter value, e.g., a corresponding time value.

The polarity of the charge in step (1) may be reversed such that Pin B is driven high and Pin A is driven low to charge the bucket capacitor. In this case, Pin B is sampled in step (3) to see if it has crossed an input low threshold.

In a further alternative embodiment that may be carried out with the circuit arrangement of FIG. 7, TouchVal may be representative of a number of cycles required to "fill" bucket capacitor 183 by way of a voltage applied to bucket capacitor 183 and scoop capacitor 181 connected in series. In this case, a per-cycle increase in charge of bucket capacitor 183 is regulated by the relative size of scoop capacitor 181. In carrying out this alternative embodiment, µP 1 may execute the following steps:

1) µP 1 clamps both pins A and B to ground, to discharge bucket capacitor 183 and scoop capacitor 181. Counter=0.
2) Pin A is set to be a high impedance input (floating), and Pin B is set high; this puts the bucket and scoop capacitors in series. The same current flows through both capacitors, and when the scoop capacitor is filled current stops flowing through both the bucket capacitor and the scoop.
3) Pin B is set to be a high impedance input (floating), and Pin A is driven low, to discharge the scoop capacitor (without discharging the bucket), so that it may be filled again.
4) Counter=counter+1 (count one scoop).
5) Pin B (still a high impedance input) is sampled to see if it has crossed an input high threshold (indicates a bucket "full" condition). If so, proceed to step (6). If not, repeat steps 2–5.
6) Algorithm is complete; Counter value is inversely proportional to a relative size of the scoop capacitor. The lower the Counter value, the greater the capacitance of the scoop capacitor. The Counter value may be used directly as a current touch value (TouchVal), or may be averaged into a new touch reading, e.g., TouchVal=(TouchVal+Counter)/2, in which case TouchVal is a moving average value.

In a "low-side" variation of the above-described further alternative embodiment, sampling is carried out at Pin A (instead of Pin B) at the time that Pin A is set to be a high impedance input. In carrying out this variation, µP 1 may execute the following steps:

1) µP 1 clamps both pins A and B to ground, to discharge bucket capacitor 183 and scoop capacitor 181. Counter=0.
2) Pin A is set to be a high impedance input (floating), and Pin B is set high; this puts the bucket and scoop in series. The same current flows through both capacitors, and when the scoop capacitor is filled current stops flowing through both the bucket capacitor and the scoop capacitor.
3) Pin A (still a high impedance input) is sampled to see if it has crossed an input low threshold (indicates a bucket "full" condition). If so, proceed to step (7). If not, then continue to step (4).
4) Pin B is set to be a high impedance input (floating) and Pin A is driven low, to discharge the scoop capacitor (without discharging the bucket) so that it may be filled again.
5) Counter=counter+1 (count one scoop).
6) Repeat steps 2–5.
7) Algorithm is complete; Counter value is inversely proportional to a relative size of the scoop capacitor. The lower the Counter value, the greater the capacitance of the scoop capacitor. The Counter value may be used directly as a current touch value (TouchVal), or may be averaged into a new touch reading, e.g., TouchVal=(TouchVal+Counter)/2, in which case TouchVal is a moving average value.

As seen in FIGS. 6 and 10–14, conductive sensor plate 145 advantageously may take the form of an adhesively applied conductive label adhered to an underside of an upper housing 185 of mouse 107, formed by top case 109 and skirt 119. Conductive label 145 may comprise, e.g., a thin flexible layer of insulative material such as clear heat stabilized polyester (e.g., Mylar™) sheet 146, printed on one side with a pattern of conductive ink 148. The sheet may, e.g., have a thickness in the range of 0.75–0.13 mm. Conductive ink 148 may be, e.g., a known carbon (graphite) or silver particle ink of the type commonly used for printing circuit lines and contacts on the layers of a membrane switch. The ink may be applied by known silk-screening processes to a thickness in the range of 0.010–0.015 mm, for example. Carbon based conductive ink is generally lower in cost, easier to apply and more rugged (resistant to the effects of abrasion) than silver-based conductive ink. Given the very low transient current of the capacitive sensor circuit (e.g., 0.1 $\mu$A average), the additional impedance of carbon based ink (as compared to silver-based ink) presents no added difficulty.

Figure 11:
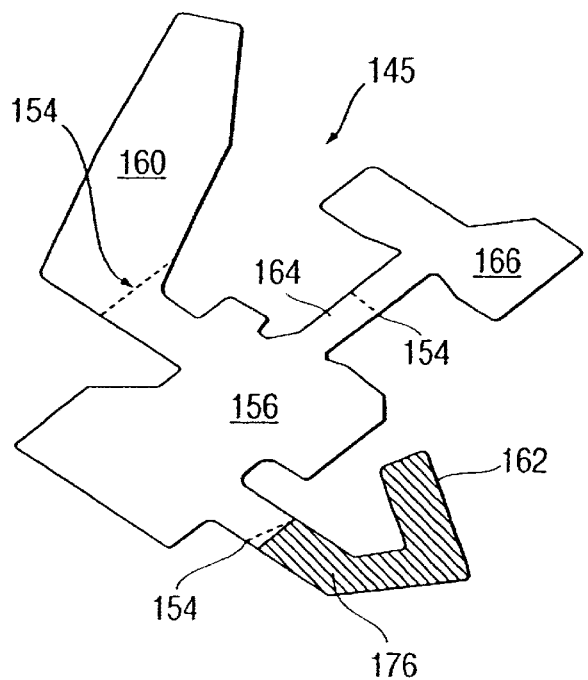
FIG. 11 is a bottom side perspective view of the conductive label shown in FIG. 10.
Figure 12:
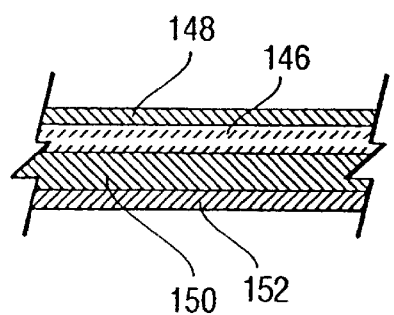
FIG. 12 is a cross-sectional view taken through a representative conductive ink bearing region of the label-type sensor plate shown in FIG. 10.
Figure 13:
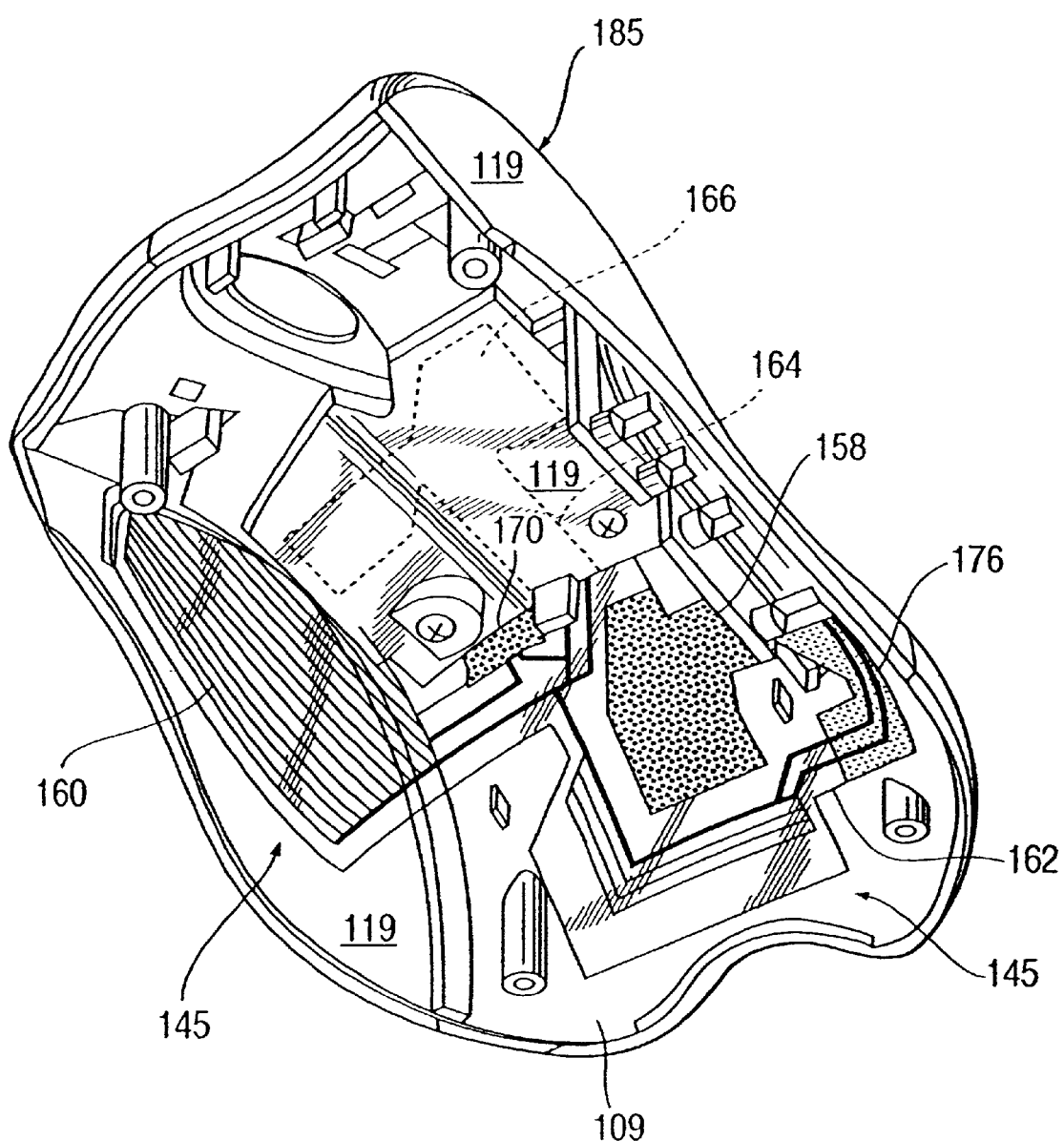
FIG. 13 is a right side bottom perspective view of the inside of an upper housing assembly of the mouse shown in FIG. 6, illustrating a layout of the label-type sensor plate shown in FIGS. 10–12 applied to the inside surface of the cover assembly.
Figure 14:
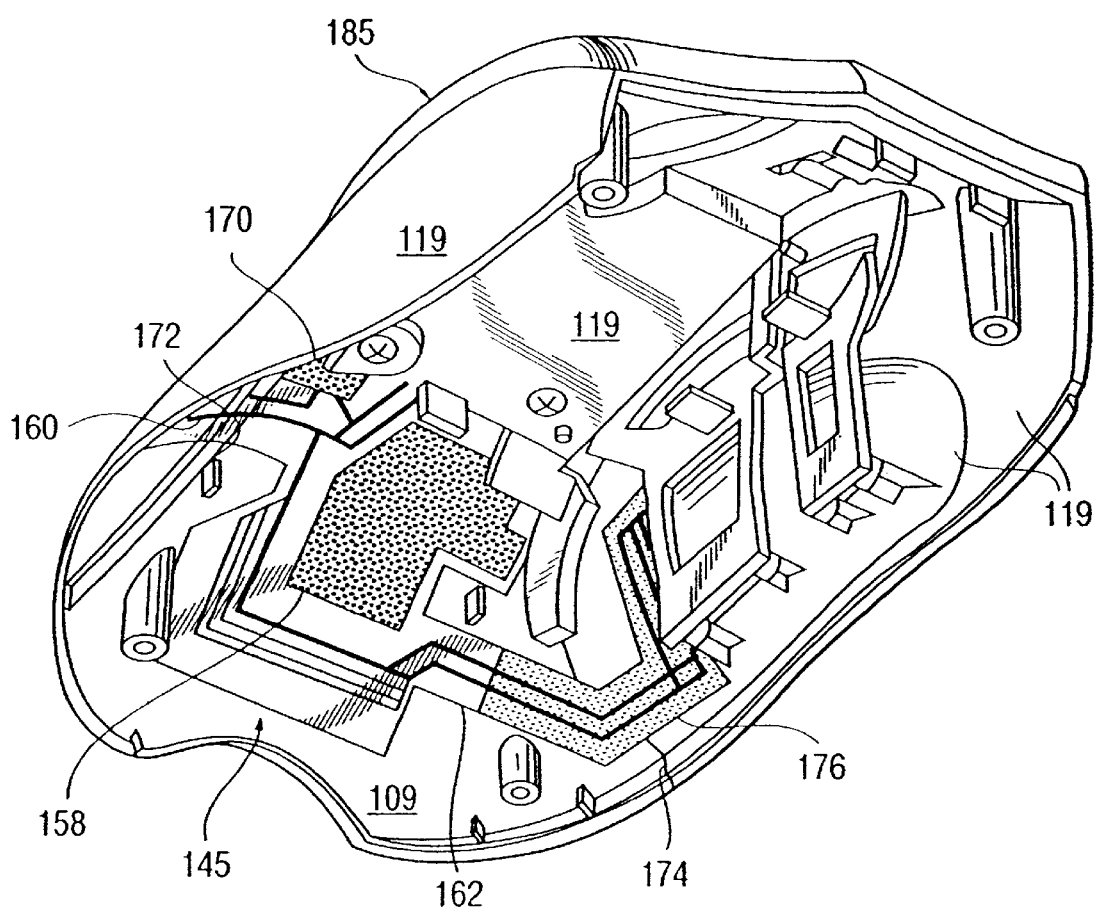
FIG. 14 is a left side bottom perspective view of the housing assembly shown in FIG. 13, further illustrating a layout of the applied label-type sensor plate.

On an opposite side of sheet 146 is a layer of adhesive 150 (e.g., 3M Company No. 467) which is exposed upon removal of a peel-off liner 152. In an exemplary embodiment, adhesive layer 150 has a nominal thickness of 0.05 mm. Liner 152 may be divided into sections by selectively placed cut lines 154, as shown in FIG. 11. This arrangement facilitates removal of liner 152 just prior to application of label 145 to housing 185.

Label 145, which may be die cut from stock sheet material, comprises a central body portion 156 of irregular, generally polygonal shape, that is applied to a central rear portion of mouse housing 185. Body portion 156 has a relatively large solid region of conductive ink 158 and a smaller conductive ink region 170. Multiple lines of conductive ink extend outwardly from region 170, to a pair of "arm" portions 160, 162, a "neck" portion 164, and a "head" portion 166.

Smaller solid conductive ink region 170 presents a contact pad for spring contact arm 144 extending from PCB 125 (see FIG. 6). The ruggedness of carbon ink material, and its inherent immunity to environmental concerns, result in a reliable interconnect at this point between spring contact arm 144 and label 145. Relatively large conductive ink region 158 is removed from direct electrical connection with smaller region 170 and the conductive lines extending therefrom. Region 158 serves to provide an additional capacitive coupling with the relative device ground, when a hand is present on or in close proximity to the mouse. In this manner, conductive region 158 tends to increase apparent capacitance when a hand is present, to thus improve the sensitivity of the sensing system.

Arm portions 160, 162 are applied so as to cover, respectively, right and left side portions of housing 185 (specifically skirt 119 thereof). Relatively large arm portion 160 extends across seam 172 formed between top case 109 and skirt 119 and then along a major part of the right side of skirt 119. Relatively small arm portion 162 extends across a seam 174 formed between skirt 119 and top case 109 and then upwardly along a relatively small rearward portion of skirt 119 (see FIG. 14). As shown, a side of sheet 146 opposite the side with the printed conductive pattern may have a region 176 of arm 162 which is printed with non-conductive ink. Region 176 forms a mask serving to block transmittance of stray light from LED 9 (within the housing) through any gap that may be formed at seam 174 formed between the housing parts. Neck portion 164 extends along a central part of housing 185, between top case 109 and skirt 119, to concealed head portion 166. Head portion 166 is applied to a central part of housing 185 located directly behind scroll wheel 163, in a small space formed between top case 109 and skirt 119.

By extending conductive material across those regions of housing 185 most likely to be grasped or touched by a user, the illustrated configuration of label 145 works well for sensing the presence of a user's hand in contact with or in close proximity to mouse 107. In addition, label 145 advantageously may serve to provide additional protection from electrostatic discharge (ESD), especially at the seams formed between the adjoined housing parts across which label 145 extends. In particular, once label 145 is applied, a spacing is created between the conductive printing and the exposed seams of housing 185, equal to the combined thickness of adhesive layer 150 and sheet 146. This spacing, and the insulative effect of the adhesive and sheet material, provide an extended electrostatic discharge (ESD) creepage path allowing sufficient isolation to protect the enclosed electronics from most electrostatic damage sources.

The mouse's circuit elements, printed circuit boards and surrounding environment, together effectively form a device ground plane relative to the sensor plate formed by conductive label 145. The use of plural closely spaced thin lines 168 of conductive ink in the different regions of label 145 serves to reduce the self-capacitance of label 145 with the device ground, such that the capacitance induced by a user's hand is more significant and detectible relative to the capacitance induced by label 145 itself. To this end, it is desirable to make the lines as thin as practicable with known silk-screening processes. For reliability, however (and as shown), it may be desirable to make the "backbone" or trunk conduction lines extra thick. This will help ensure that a break in conductivity does not occur along one of those lines, thus reducing the possibility of a loss of electrical continuity throughout an entire plate region.

The human hand is a complex structure, often requiring corresponding complex geometries for man/machine actuation. Many techniques for presentation of complex shaped conductive materials required for capacitive detection of human touch are relatively expensive or present other manufacturability or reliability drawbacks. A conductive plate in the form of a flexible adhesive label provides an elegant, cost effective and technically reliable approach for providing coverage of (and adherence to) the complex and/or interconnected surfaces of ergonomically designed electronic device housings. Housing 185 is one illustrative example, comprising concave and convex curvatures that vary along orthogonal axes over a roughly hemispherical shape, and seams between multiple interconnected housing parts.

A further advantage of the flexible adhesive label approach of the invention is the ease with which labels of different shape and configurations can be cut to extend around (avoid) bosses and other structural obstacles that may be present on a housing portion to which the sensor is to be applied. Of course, numerous conductor configurations besides a label may be used to create a capacitive coupling with a device ground that may be modulated by the presence or absence of an object or body portion to be sensed, e.g., flat and three-dimensional stamped metal plates, wires, conductive rods, etc. On the other hand, any capacitive detection system (single or multiple plate) may benefit from the present inventive conductive label approach, especially where the need arises to sense proximity to or contact with complex, interrupted and/or interconnected surface areas.

Figure 9:
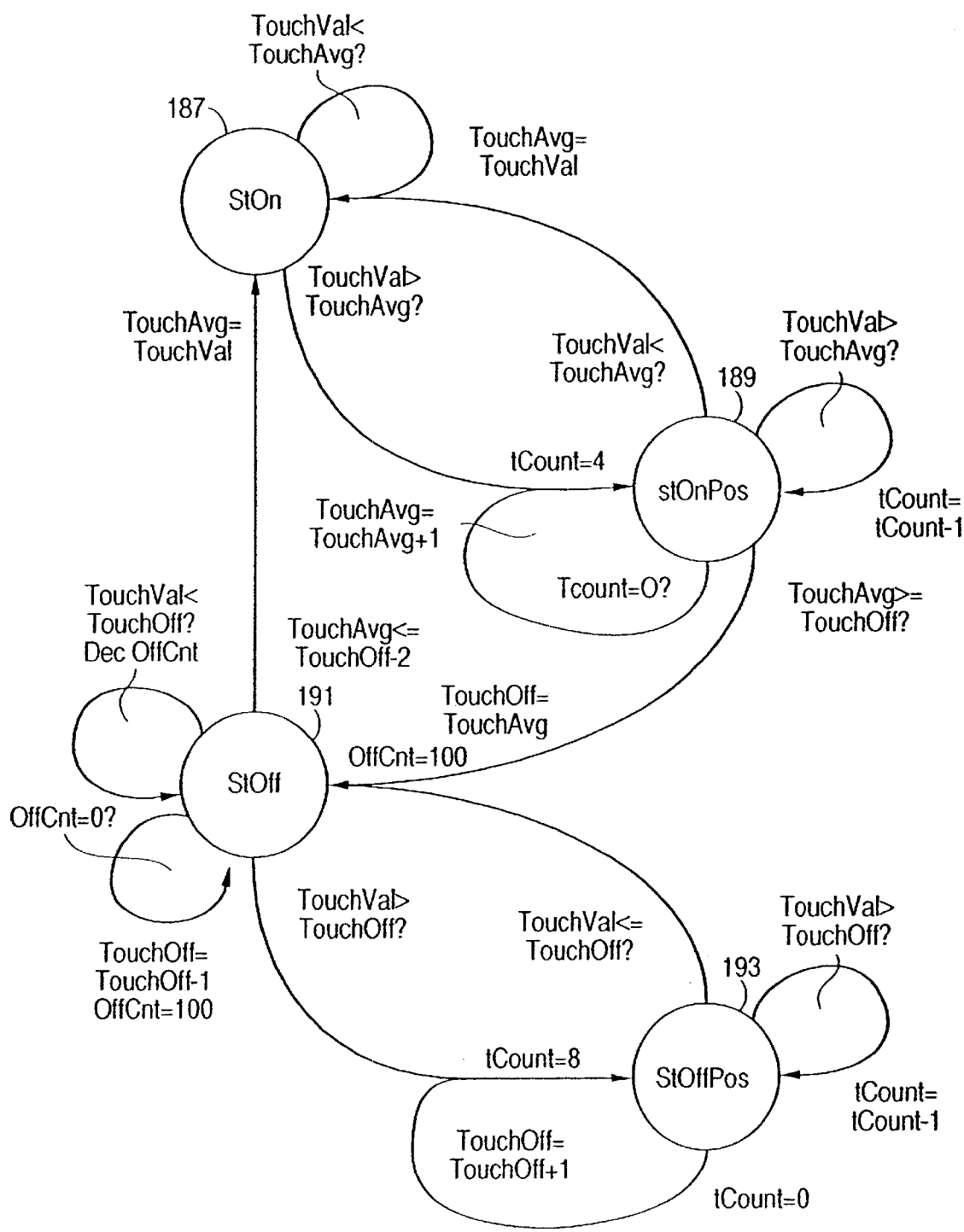
FIG. 9 is a state machine diagram illustrating exemplary logic flow and control in accordance with the invention, for carrying out capacitive sensing with circuitry as illustrated in FIG. 7.
Figure 10:
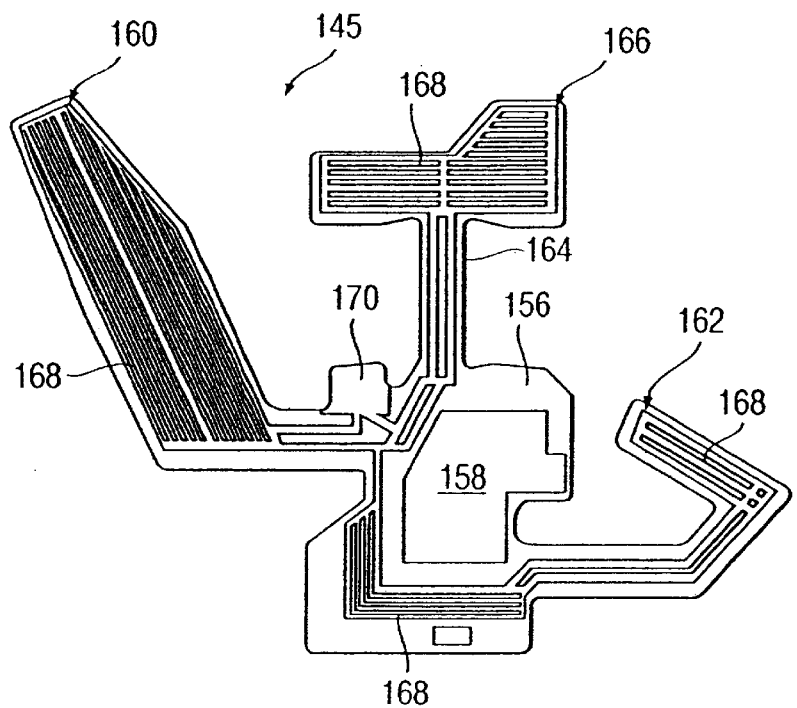
FIG. 10 is a top plan view of a flexible conductive label that may serve as a conductive plate of the "scoop" capacitor provided as part of the circuit of FIG. 7.

A sensing algorithm for determining and outputting a touch/proximity or no touch/proximity flag (ON/OFF) is now described, with reference to FIG. 9. As a matter of convenience, the terms "touch," "touching," etc. are used in the following description of the algorithm to refer to touch and/or close proximity. The touch flag ON is set when the algorithm (state machine) is in the stOn or stOnPos states 187, 189, and is cleared in the stOff and stOffPos states 191, 193. The touch algorithm periodically reads a new touch value (TouchVal) using the above-described counting algorithm. The following is a list of variables that may be used in the sensing algorithm:

TouchVal Current touch reading (result from above counting algorithm).

TouchOff Current OFF threshold value.

TouchAvg In the ON states, holds a filtered (pseudo-average) value which is used in the comparison to enter the "stOff" state (see below).

TouchCnt A filtering count value used in the different touch states.

There are four different states the touch algorithm can be in:

stOff: User is not touching, algorithm waiting to go ON. A check for entering the "stOn" state (see below) is performed here.

StOffpos: User is not touching, TouchVal>TouchOff value. This state is a filter, and ratchets TouchOff up slowly.

StOn: User is touching; algorithm is waiting to go to the "stOff" state

StOnPos: User is touching, TouchVal>TouchAvg. This state is a filter which ratchets TouchAvg up slowly. A check for entering the stoff state is performed here.

With reference to FIG. 9, operation of the touch algorithm may be summarized as follows. The state machine transitions from stoff state 191 to stOn state 187 upon TouchVal falling a predetermined amount below (e.g., more than 2 counts below) TouchOff. The state machine transitions from stOn state 187 to stoff state 191 upon a filtered (pseudo-average) touch value (TouchAvg) reaching or exceeding TouchOff. Each time that TouchVal exceeds TouchAvg, state stOnPos 189 is entered, wherein a counter initially set, e.g., at 4 is decremented. If TouchVal remains higher than TouchAvg such that the counter is decremented to 0, the value of TouchAvg is incremented to TouchAvg+1. TouchAvg is reset to TouchVal upon TouchVal dropping to or below TouchAvg, and upon a state transition from stOff to stOn.

The threshold count value TouchOff is preferably dynamically adjusted in the following manner. When batteries 3 are first installed, the touch-state algorithm is preferably initialized to the stOn state. TouchVal is set to the current touch reading, and the initial TouchOff value is set to a maximum counter value of 255. As TouchVal will not ordinarily ever reach this maximum value, this forces the touch algorithm to remain in the stOn state until the state machine of FIG. 8 transitions to the SHUTDOWN state via a timeout (e.g., 180 sec.) of no mouse activity. At this point TouchOff is reset to TouchAvg, which is determined in the manner described above. Preferably, any transition to SHUTDOWN from another state will cause TouchOff to be set to the current TouchAvg. At this point, the system can generally correctly assume that no hand is present.

If, during stOff state 191, TouchVal exceeds a current value of TouchOff, a state stOffPos 193 is entered wherein a counter initially set, e.g., at 8 is decremented. If TouchVal remains higher than TouchOff such that the counter is decremented to 0, the value of TouchOff is incremented to TouchOff+1. TouchOff is reset to TouchAvg upon a state transition from stOnPos to stOff (which occurs upon TouchAvg reaching or exceeding TouchOff). In stOff state 191, TouchOff is decremented by 1 each time a current touch reading (TouchVal) falls just below TouchOff (e.g., TouchOff−2≦TouchVal<TouchOff) for a preset number of control cycles (e.g., 100).

The preferred states, and state transition conditions, are further described below.

stOn State 187

If TouchVal is <TouchAvg, then TouchAvg is set to the current touch reading (no state change).

If TouchVal is >TouchAvg, then counter TCount is initialized to 4, and the state machine transitions to stOnPos state 189.

stOnPos State 189

If TouchVal is <TouchAvg, then TouchAvg is set equal to TouchVal and the state machine transitions to stOn state 187.

If TouchVal is >TouchAvg, TCount is decremented, and if the count=0 (4successive TouchVal readings>TouchAvg), then TouchAvg is incremented. This state serves to perform a slow filter for the touch readings, so momentary drops will not unnecessarily put the touch-state machine in the stOff state 191.

If TouchAvg>=TouchOff, then the state machine transitions to stOff state 191 and another counter OffCnt (which may use the same register as TCount) is set to 100. TouchOff is set to TouchAvg.

stOff State 191

If TouchVal is >TouchOff, then the state machine transitions to stOffPos state 193 and counter TCount is set to 8.

If TouchVal is <(TouchOff−2), then the state machine transitions to the stOn state, and TouchAvg is initialized to TouchVal.

If TouchVal is <TouchOff, but>=(TouchOff−2), then counter OffCnt is decremented. If OffCnt=0, then TouchOff is decremented, and OffCnt is reset to 100. This is the case where a lower TouchOff value is learned (i.e., when the mouse is moved to a more capacitive environment). When the mouse state machine enters SHUTDOWN state 165, and the state machine is set to stOff state 191, TouchOff is set to TouchAvg.

stOffPos State 193

If TouchVal is >TouchOff, then TCount is decremented. If TCount=0, then TouchOff is incremented and TCount is reset to 8. This is the condition where a higher TouchOff value is learned (i.e., when the mouse is moved to a less capacitive environment).

If TouchVal is<=TouchOff, then OffCnt is set to 100 and the state machine transitions to the stOff state.

The present invention has been described in terms of preferred and exemplary embodiments thereof. Numerous other embodiments, modifications and variations within the scope and spirit of the appended claims will occur to persons of ordinary skill in the art from a review of this disclosure. In the claims, the use of the labels for algorithm variables appearing in the specification is for convenience and clarity and is not intended to have any limiting effect.

What is claimed is:

1. A user operated data input device comprising:

first and second data input signal generating means for generating respective first and second data input signals;

a power supply for selectively supplying electrical power to said first and second input signal generating means;

a sensing system for sensing the presence of an operation instrumentality in contact with or close proximity to said input device and generating a signal indicative of an ON state wherein said operation instrumentality is in contact with or close proximity to said input device, and an OFF state wherein said operation instrumentality is not in contact with or close proximity to said input device;

a power management system for controlling the supply of power to said first and second input signal generating means, said power management system providing switching between at least three power states, wherein:

in a first of said power states each of said first and second input signal generating means is powered-up to a normal operation level and sampled for input activity;

in a second of said power states each of said first and second input signal generating means are cycled between a powered-up state wherein sampling for input activity is carried out, and a powered down state;

in a third of said power states said first signal generating means remains powered down while said second signal generating means is cycled between a powered-up state wherein sampling for input activity is carried out, and a powered down state;

a transition from said first power state to said third power state occurs upon a transition of said sensing system from said ON state to said OFF state;

a transition from said third power state to one of said first and second power states occurs upon a transition of said sensing system from said OFF state to said ON state; and a transition from said second power state to said first power state occurs upon a detection of input activity during said sampling of said first and second input signal generating means.

2. A user operated data input device according to claim 1, wherein operation of said first input signal generating means consumes a greater amount of power than operation of said second input signal generating means.

3. A user operated data input device according to claim 2, wherein said first input signal generating means comprises an optical tracking engine.

4. A user operated data input device according to claim 1, wherein said input device is a computer peripheral device.

5. A user operated data input device according to claim 4, wherein said input device is an external computer peripheral device linkable to a separate host computer.

6. A user operated data input device according to claim 5, wherein said external computer peripheral device is linkable to said host computer without a hard-wired connection.

7. A user operated data input device according to claim 5, further comprising an RF transmitter for linking said computer peripheral device to said host computer without a hard-wired connection, and wherein said RF transmitter is powered up in said first power state and powered down in said third power state.

8. A user operated data input device according to claim 7, wherein said RF transmitter is powered down also in said second power state.

9. A user operated data input device according to claim 4, wherein said computer peripheral device is a cursor control device.

10. A user operated data input device according to claim 9, wherein said first input signal generating means comprises an optical tracking engine of said cursor control device.

11. A user operated data input device according to claim 10, said power management system providing switching between four power states, wherein:

in a fourth power state a light source of said optical tracking engine is operated at a reduced flash rate;

a transition from at least one of said first and second power states to said fourth power state occurs upon said optical tracking engine detecting the absence of a trackable surface; and a transition from said fourth power state to at least one of said first and second power states occurs upon said optical tracking engine detecting a trackable surface.

12. A user operated data input device according to claim 10, wherein said cursor control device is linkable to a host computer without a hard-wired connection.

13. A user operated data input device according to claim 10, further comprising an RF transmitter for linking said cursor control device to a host computer without a hard-wired connection, and wherein said RF transmitter is powered up in said first power state and powered down in said third power state.

14. A user operated data input device according to claim 13, wherein said RF transmitter is powered down also in said second power state.

15. A user operated data input device according to claim 10, wherein said cursor control device is a computer mouse, and said optical tracking engine is configured to track on a planar surface upon which the mouse rests.

16. A user operated data input device according to claim 10, wherein said second input signal generating means comprises at least one user actuatable two-position switch.

17. A user operated data input device according to claim 16, wherein said second input signal generating means further comprises a scrolling device.

18. A user operated data input device according to claim 1, wherein a transition from said third power state to said first power state further occurs upon a detection of input activity during said sampling of said second input signal generating means.

19. A user operated data input device according to claim 1, wherein a transition from said first power state to said second power state occurs upon an absence, for a first predetermined interval, of detected input activity during said sampling of said first and second input signal generating means.

20. A user operated data input device according to claim 19, said power management system providing switching between four power states, wherein:

in a fourth of said power states each of said first and second input signal generating means is cycled between a powered-up state wherein sampling for input activity is carried out, and a powered down state, the cycling in said fourth power state being carried out at a lower rate than the cycling in said second power state; and a transition from said second state to said fourth state occurs upon an absence, for a second predetermined interval larger than said first predetermined interval, of detected input activity during said sampling of said first and second input signal generating means.

21. A user operated data input device according to claim 20, wherein a transition from said fourth power state to said third power state occurs upon an absence, for a third predetermined interval larger than said second predetermined interval, of detected input activity during said sampling of said first and second input signal generating means.

22. A user operated data input device according to claim 1, wherein said sensing system is a capacitive sensing system.

23. A user operated data input device according to claim 22, wherein said capacitive sensing system comprises:

a first conductor capacitively coupled to a ground to thereby form a scoop capacitor having a capacitance which varies in relation to the proximity of said operation instrumentality to said conductor;

a pair of second and third conductors forming a bucket capacitor having a capacitance which is larger than a maximum capacitance of said scoop capacitor;

an input threshold switch;

switching means for selectively: connecting one of said scoop capacitor and said bucket capacitor to a voltage source to charge said one capacitor, transferring charge between said scoop capacitor and said bucket capacitor, and applying a voltage of said bucket capacitor to said input threshold switch;

detector means for detecting an input state of said input threshold switch;

determining means for determining a value (TouchVal) relating to a number of cycles of charge transfer between said scoop capacitor and said bucket capacitor corresponding to a detection of an input state transition of said input threshold switch by said detector means; and signal generating means for generating, based upon TouchVal, a signal indicative of an ON state wherein said operation instrumentality is in contact with or close proximity to said data input device, and an OFF state wherein said operation instrumentality is not in contact with or close proximity to said data input device.

24. A user operated data input device according to claim 23, wherein said device is a computer peripheral device, and said first conductor is mounted on said computer peripheral device.

25. A user operated data input device according to claim 24, wherein said computer peripheral device is an external computer peripheral device linkable to a separate host computer.

26. A user operated data input device according to claim 25, further comprising an RF transmitter for linking said external computer peripheral device to said host computer, and wherein said RF transmitter is powered up in said first power state and powered down in said third power state.

27. A user operated data input device according to claim 26, wherein said external computer peripheral device is a cursor control device and said first input signal generating means comprises an optical tracking engine.

28. A user operated data input device according to claim 27, further comprising an RF transmitter for linking said cursor control device to a host computer, and wherein said RF transmitter is powered up in said first power state and powered down in said third power state.

29. In a user operated data input device comprising first and second data input signal generating means for generating respective first and second data input signals, and a power supply for selectively supplying electrical power to said first and second input signal generating means, a method of power management comprising:

sensing the presence of an operation instrumentality in contact with or close proximity to said input device and generating a signal indicative of an ON state wherein said operation instrumentality is in contact with or close proximity to said input device, and an OFF state wherein said operation instrumentality is not in contact with or close proximity to said input device;

controlling the supply of power to said first and second input signal generating means by providing switching between at least three power states, wherein:

in a first of said power states each of said first and second input signal generating means is powered-up to a normal operation level and sampled for input activity;

in a second of said power states each of said first and second input signal generating means are cycled between a powered-up state wherein sampling for input activity is carried out, and a powered down state;

in a third of said power states said first signal generating means remains powered down while said second signal generating means is cycled between a powered-up state wherein sampling for input activity is carried out, and a powered down state;

a transition from said first power state to said third power state occurs upon a transition of said sensing system from said ON state to said OFF state;

a transition from said third power state to one of said first and second power states occurs upon a transition of said sensing system from said OFF state to said ON state; and a transition from said second power state to said first power state occurs upon a detection of input activity during said sampling of said first and second input signal generating means.

30. A method of power management according to claim 29, wherein operation of said first input signal generating means consumes a greater amount of power than operation of said second input signal generating means.

31. A method of power management according to claim 30, wherein said first input signal generating means comprises an optical tracking engine.

32. A method of power management according to claim 29, wherein said user operated data input device further comprises an RF transmitter for linking said computer peripheral device to a host computer without a hard-wired connection, said method further comprising powering up said RF transmitter in said first power state and powering down said RF transmitter in said third power state.

33. A method of power management according to claim 32, wherein said RF transmitter is powered down also in said second power state.

34. A method of power management according to claim 30, wherein said computer peripheral device is a cursor control device.

35. A method of power management according to claim 34, wherein said first input signal generating means comprises an optical tracking engine of said cursor control device.

36. A method of power management according to claim 35, said method comprising switching between four power states, wherein:

in a fourth power state a light source of said optical tracking engine is operated at a reduced flash rate;

a transition from at least one of said first and second power states to said fourth power state occurs upon said optical tracking engine detecting the absence of a trackable surface; and a transition from said fourth power state to at least one of said first and second power states occurs upon said optical tracking engine detecting a trackable surface.

37. A method of power management according to claim 36, wherein said user operated data input device further comprises an RF transmitter for linking said cursor control device to a host computer without a hard-wired connection, said method further comprising powering up said RF transmitter in said first power state and powering down said RF transmitter in said third power state.

38. A method of power management according to claim 37, wherein said RF transmitter is powered down also in said second power state.

39. A method of power management according to claim 29, wherein a transition from said third power state to said first power state further occurs upon a detection of input activity during said sampling of said second input signal generating means.

40. A method of power management according to claim 29, wherein a transition from said first power state to said second power state occurs upon an absence, for a first predetermined interval, of detected input activity during said sampling of said first and second input signal generating means.

41. A method of power management according to claim 29, comprising switching between four power states, wherein:

in a fourth of said power states each of said first and second input signal generating means is cycled between a powered-up state wherein sampling for input activity is carried out, and a powered down state, the cycling in said fourth power state being carried out at a lower rate than the cycling in said second power state; and a transition from said second state to said fourth state occurs upon an absence, for a second predetermined interval larger than said first predetermined interval, of detected input activity during said sampling of said first and second input signal generating means.

42. A method of power management according to claim 41, wherein a transition from said fourth power state to said third power state occurs upon an absence, for a third predetermined interval larger than said second predetermined interval, of detected input activity during said sampling of said first and second input signal generating means.

43. A method of power management according to claim 29, wherein said sensing is carried out utilizing capacitive sensing.

44. A method of power management according to claim 43, wherein said capacitive sensing comprises:

providing a first conductor capacitively coupled to a ground to thereby form a scoop capacitor having a capacitance which varies in relation to the proximity of said operation instrumentality to said conductor; a pair of second and third conductors forming a bucket capacitor having a capacitance which is larger than a maximum capacitance of said scoop capacitor; and an input threshold switch;

performing switching to selectively: connect one of said scoop capacitor and said bucket capacitor to a voltage source to charge said one capacitor, transfer charge between said scoop capacitor and said bucket capacitor, and apply a voltage of said bucket capacitor to said input threshold switch;

detecting an input state of said input threshold switch;

determining a value (TouchVal) relating to a number of cycles of charge transfer between said scoop capacitor and said bucket capacitor corresponding to a detection of an input state transition of said input high threshold switch; and generating, based upon TouchVal, a signal indicative of an ON state wherein said operation instrumentality is in contact with or close proximity to said data input device, and an OFF state wherein said operation instrumentality is not in contact with or close proximity to said data input device.

* * * * *

UNITED STATES PATENT AND TRADEMARK OFFICE
CERTIFICATE OF CORRECTION

PATENT NO. : 6,611,921 B2
DATED : August 26, 2003
INVENTOR(S) : Mark W. Casebolt et al.

It is certified that error appears in the above-identified patent and that said Letters Patent is hereby corrected as shown below:

Title page,
Item [56], References Cited, U.S. PATENT DOCUMENTS, "Domberger" has been replaced with -- Dornberger --.
OTHER PUBLICATIONS, please insert -- MIRSUHIRO YAMADA, TAKASHI TAKEBAYASHI, SHUNICHI NOTOYAMA, AND KENZO WATANABE, A Switched Capacitor Interface for Capacitive Pressure Sensors, 1992, pp. 81-86, IEEE --.

Column 1,
Line 62, "and applications" has been replaced with -- and copending applications --.

Column 14,
Line 24, "113" has been replaced with -- 173 --.

Signed and Sealed this

Sixteenth Day of March, 2004

JON W. DUDAS
*Acting Director of the United States Patent and Trademark Office*